(12) United States Patent
Brinkman et al.

(10) Patent No.: US 11,278,910 B2
(45) Date of Patent: Mar. 22, 2022

(54) SYSTEMS AND METHOD FOR GRINDING A FOOD PRODUCT

(71) Applicant: Creator, Inc., San Francisco, CA (US)

(72) Inventors: James Brinkman, South San Francisco, CA (US); Steven Frehn, San Francisco, CA (US); Alexandros Vardakostas, San Francisco, CA (US); Michael Balsamo, San Francisco, CA (US); Noe Esparza, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 0 days.

(21) Appl. No.: 16/699,600

(22) Filed: Nov. 30, 2019

(65) Prior Publication Data

US 2020/0101469 A1  Apr. 2, 2020

Related U.S. Application Data

(63) Continuation of application No. PCT/US2019/038339, filed on Jun. 20, 2019, which
(Continued)

(51) Int. Cl.
*B02C 18/30* (2006.01)
*B02C 18/22* (2006.01)
(Continued)

(52) U.S. Cl.
CPC ........... *B02C 18/305* (2013.01); *A22C 5/00* (2013.01); *A22C 7/0076* (2013.01); *B02C 18/22* (2013.01)

(58) Field of Classification Search
CPC ....... A22C 7/0069; A22C 7/0076; A22C 5/00; A22C 7/0023; A22C 7/003; A22C 7/0046;
(Continued)

(56) References Cited

U.S. PATENT DOCUMENTS 2,008,725 A    7/1935  Parker
3,128,674 A *  4/1964  Ganchar ................. F15B 15/16
                                                    91/167 R
(Continued)

FOREIGN PATENT DOCUMENTS

JP    H06007127 A    1/1994
JP    H07215471 A    8/1995
(Continued)

OTHER PUBLICATIONS

International Search Report and Written Opinion for PCT Application No. PCT/US2016/032910, dated Sep. 27, 2016, 16 pages.
(Continued)

*Primary Examiner* — Tu B Hoang
*Assistant Examiner* — Vy T Nguyen
(74) *Attorney, Agent, or Firm* — Miller Johnson

(57) ABSTRACT

A system includes a food dispenser, a cooking surface, and an arm assembly. The arm assembly is configured to receive a food product from the food dispenser and transport the food product to the cooking surface. The arm assembly includes an arm portion, an actuator, a cylinder, and a piston. The actuator drives rotation of the arm portion about a first rotational axis. The cylinder is attached to the arm portion and is rotatable relative to the arm portion about a second rotational axis. The piston is axially movable within the cylinder. The piston includes multiple stages. At least one of the stages is movable axially relative to another of the stages between a first position and a second position.

20 Claims, 17 Drawing Sheets

Related U.S. Application Data is a continuation-in-part of application No. 15/157,164, filed on May 17, 2016, now Pat. No. 10,743,552.

(60) Provisional application No. 62/687,791, filed on Jun. 20, 2018, provisional application No. 62/162,796, filed on May 17, 2015.

(51) Int. Cl.
*A22C 5/00* (2006.01)
*A22C 7/00* (2006.01)

(58) Field of Classification Search
CPC ......... A22C 7/0092; B29C 33/46; A21C 5/04; A23G 3/2023; B30B 11/16; A23L 5/15; A47J 37/0611; A47J 37/0629; H05B 6/12; H05B 6/1272; H05B 6/065; B02C 18/305; B02C 18/22; B02C 25/00
USPC .......... 99/450; 426/397, 410, 513, 148, 260, 426/362, 314, 520
See application file for complete search history.

(56) References Cited

U.S. PATENT DOCUMENTS

| | | | |
|---|---|---|---|
| 3,427,649 A | 2/1969 | Fay | |
| 3,731,345 A | 5/1973 | Brackman | |
| 3,733,653 A * | 5/1973 | Javaloy | A22C 11/06 452/36 |
| 4,025,985 A | 5/1977 | Rousseau | |
| 4,138,768 A | 2/1979 | Roth | |
| 4,193,167 A | 3/1980 | Orlowski et al. | |
| 4,936,193 A * | 6/1990 | Stoll | B23Q 11/0825 220/8 |
| 4,957,425 A * | 9/1990 | Fay | A22C 7/0069 425/362 |
| 4,987,643 A | 1/1991 | Powers et al. | |
| 5,074,774 A * | 12/1991 | Nose | B30B 15/304 425/148 |
| 5,309,958 A * | 5/1994 | Ueda | B65B 39/00 141/90 |
| 5,341,724 A * | 8/1994 | Vatel | F15B 15/16 91/1 |
| 5,365,835 A | 11/1994 | Naramura | |
| 5,493,958 A | 2/1996 | Naramura | |
| 5,540,943 A | 7/1996 | Naramura | |
| 5,546,848 A | 8/1996 | Naramura | |
| 5,549,040 A | 8/1996 | Naramura | |
| 5,562,183 A | 10/1996 | Naramura | |
| 5,613,418 A * | 3/1997 | Guido | F15B 11/036 91/167 R |
| 6,136,361 A | 10/2000 | D'Alterio | |
| 6,957,781 B2 * | 10/2005 | Gowens | B67C 3/001 239/112 |
| 2004/0247765 A1 * | 12/2004 | Nagai | A23L 2/70 426/598 |
| 2005/0193901 A1 * | 9/2005 | Buehler | A47J 44/00 99/468 |
| 2006/0078642 A1 | 4/2006 | Palese | |
| 2007/0034094 A1 | 2/2007 | Tatham | |
| 2008/0230351 A1 | 9/2008 | Taylor et al. | |
| 2012/0058213 A1 * | 3/2012 | Lindee | B29C 37/0003 425/135 |
| 2013/0337128 A1 | 12/2013 | Van Gerwen et al. | |
| 2016/0215773 A1 * | 7/2016 | Johansson | F16J 1/01 |
| 2016/0374357 A1 * | 12/2016 | Lok | A22C 17/0026 425/162 |

FOREIGN PATENT DOCUMENTS

| | | |
|---|---|---|
| JP | H07215472 A | 8/1995 |
| JP | H07227195 A | 8/1995 |
| JP | H07227196 A | 8/1995 |
| JP | H07227197 A | 8/1995 |
| JP | H07227198 A | 8/1995 |
| JP | H07227199 A | 8/1995 |
| JP | H07232807 A | 9/1995 |
| JP | H07255604 A | 10/1995 |
| JP | H07313373 A | 12/1995 |
| JP | H0871003 A | 3/1996 |
| JP | 3178899 B2 | 6/2001 |

OTHER PUBLICATIONS

Office Action for CN Application No. 2016800432820; dated Aug. 20, 2019; 6 pages.

International Search Report and Written Opinion for PCT Application No. PCT/US2019/038339; dated Oct. 1, 2019; 7 pages.

* cited by examiner

SYSTEMS AND METHOD FOR GRINDING A FOOD PRODUCT

CROSS-REFERENCE TO RELATED APPLICATIONS

This application is a continuation of PCT/US2019/038339 filed Jun. 20, 2019, which is a continuation-in-part of U.S. patent application Ser. No. 15/157,164 filed on May 17, 2016, which claims the benefit of U.S. Provisional Application No. 62/162,796 filed on May 17, 2015. This application also claims the benefit of U.S. Provisional Application No. 62/687,791 filed on Jun. 20, 2018. The entire disclosures of the above applications are incorporated herein by reference.

FIELD

The present disclosure relates generally to the field of food preparation and more specifically to a new and useful system and method for grinding and transporting a food product in the field of on-demand food preparation.

BACKGROUND

This section provides background information related to the present disclosure and is not necessarily prior art.

Preparation of foodstuffs (for example, hamburgers, sandwiches, etc.) according to a consumer's custom order can be time-consuming and labor-intensive. Furthermore, the process of preparing custom-ordered foodstuffs is susceptible to errors and wide variations in quality. The present disclosure provides an automated food preparation system that can quickly and accurately prepare foodstuffs according to a wide variety of possible custom orders with limited human involvement.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system may include a food dispenser, a cooking surface, and an arm assembly. The arm assembly is configured to receive a food product from the food dispenser and transport the food product to the cooking surface. The arm assembly may include an arm portion, an actuator, a cylinder, and a piston. The actuator may drive rotation of the arm portion about a first rotational axis. The cylinder may be attached to the arm portion and may be rotatable relative to the arm portion about a second rotational axis. The piston is axially movable within the cylinder.

In some configurations, the piston includes a plurality of stages. At least one of the stages may be movable axially relative another of the stages between a first position and a second position.

In some configurations, the plurality of stages include an outer stage, an intermediate stage, and an inner stage. The outer stage surrounds and movably receives the intermediate stage. The intermediate stage surrounds and movably receives the inner stage.

In some configurations, a pin extends through apertures in the outer, intermediate, and inner stages.

In some configurations, the apertures of the inner stage are sized relative to the pin to allow a first range of axial movement of the inner stage relative to the pin.

In some configurations, the apertures of the intermediate stage are sized relative to the pin to allow a second range of axial movement of the intermediate stage relative to the pin.

In some configurations, the first range of axial movement is greater than the second range of axial movement.

In some configurations, axially facing surfaces of the stages are coplanar in the first position and are axially spaced apart from each other in the second position.

In some configurations, the arm portion is pivotable about a third rotational axis to move the cylinder between a raised position and a lowered position.

In some configurations, the second and third rotational axes are perpendicular relative to the first rotational axis.

In some configurations, the arm portion includes a first arm portion and a second arm portion. The second arm portion may be pivotably connected to the first arm portion and may support the cylinder for rotation about the second rotational axis.

In some configurations, the system includes a load cell attached to the first and second arm portions.

In some configurations, the food dispenser is a grinder.

In another form, the present disclosure provides a system that may include a food dispenser and an arm assembly. The arm assembly may be configured to receive a food product from the food grinder and transport the food product. The arm assembly may include an arm portion, a cylinder, and a piston. The cylinder is attached to the arm portion and movable relative to the food dispenser between a load position and an unload position. The piston is axially movable within the cylinder and configured to support the food product when the cylinder is in the load position. The piston may include a plurality of stages. At least one of the stages may be movable axially relative to another of the stages between a first position and a second position.

In some configurations, the plurality of stages include an outer stage, an intermediate stage, and an inner stage.

In some configurations, the outer stage surrounds and movably receives the intermediate stage.

In some configurations, the intermediate stage surrounds and movably receives the inner stage.

In some configurations, a pin extends through apertures in the outer, intermediate, and inner stages.

In some configurations, the apertures of the inner stage are sized relative to the pin to allow a first range of axial movement of the inner stage relative to the pin.

In some configurations, the apertures of the intermediate stage are sized relative to the pin to allow a second range of axial movement of the intermediate stage relative to the pin.

In some configurations, the first range of axial movement is greater than the second range of axial movement.

In some configurations, axially facing surfaces of the stages are coplanar in the first position and are axially spaced apart from each other in the second position.

In some configurations, the system includes a load cell attached to the arm portion and detecting a weight of the food product in the cylinder.

In some configurations, the arm assembly includes a gas passage in communication with an interior of the cylinder between the piston and a closed axial end of the cylinder.

In some configurations, the system includes a source of compressed gas in communication with the gas passage and providing compressed gas to the interior of the cylinder.

In some configurations, the compressed gas in the interior of the cylinder causes movement of at least one of the stages of the piston relative to another of the stages.

In some configurations, the system includes a cooking surface. The arm portion may position the cylinder over the cooking surface while the cylinder is in the unload position.

In some configurations, the arm portion is rotatable about a first rotational axis and about a second rotational axis that is perpendicular to the first rotational axis.

In some configurations, the food dispenser is a grinder.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

The following description of the embodiments of the invention is not intended to limit the invention to these embodiments but rather to enable a person skilled in the art to make and use this invention.

1. System

Figure 1A:
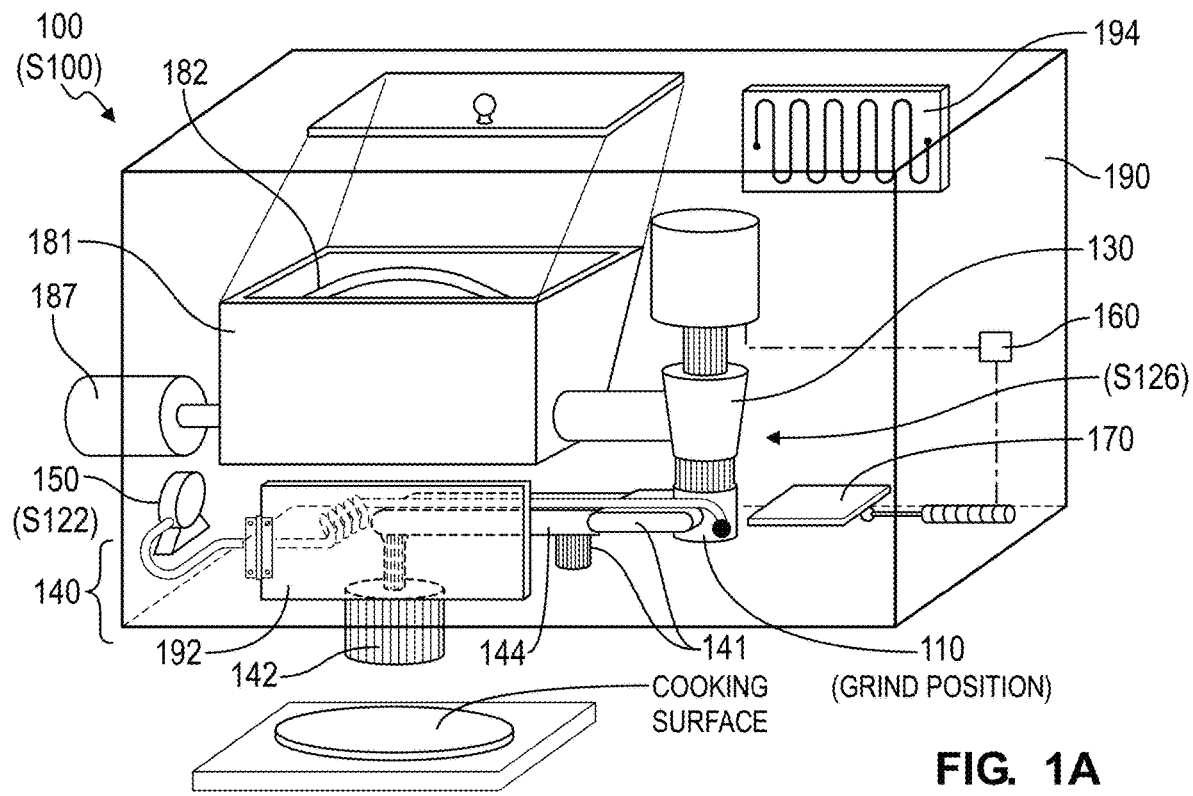
FIGS. 1A and 1B are schematic representations of a system.
Figure 1B:
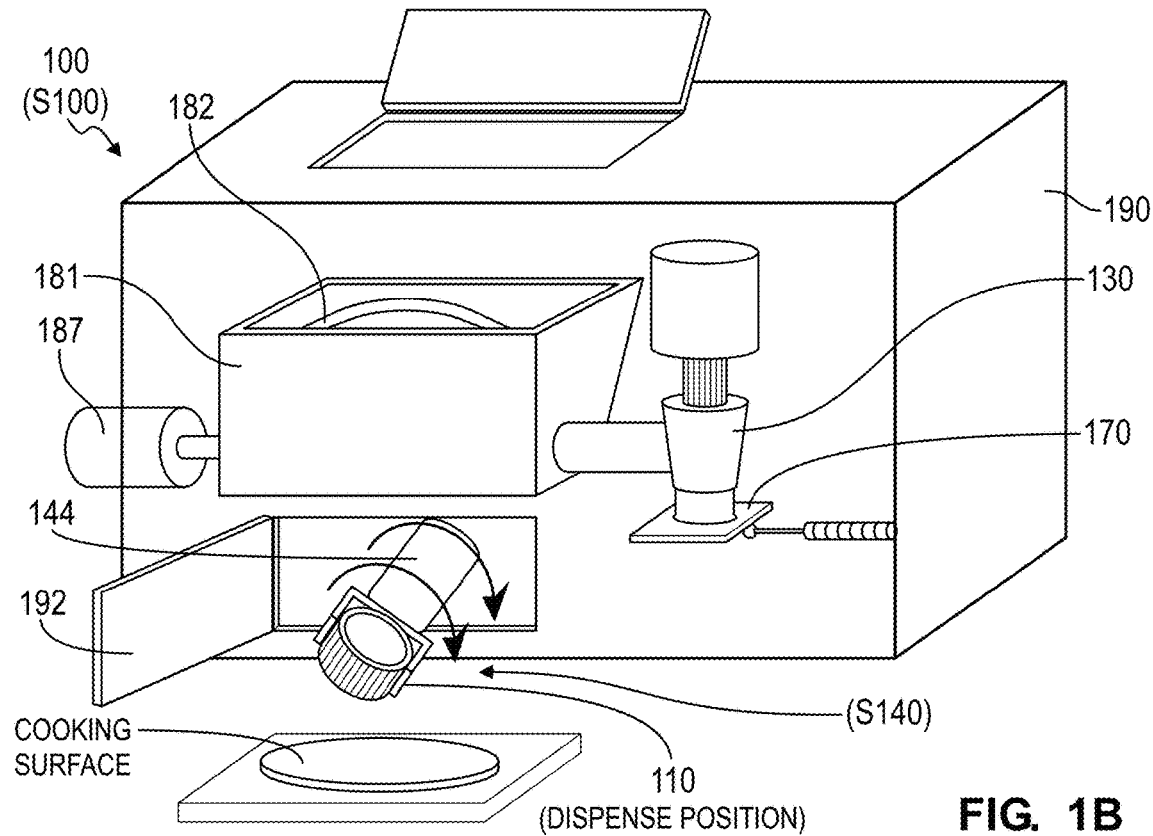

As shown in FIGS. 1A and 1B, a system 100 for grinding a meat patty includes: a cylinder 110 defining a cylindrical internal wall; a piston 120 sliding within the cylinder 110 and including a scraper engaging the cylindrical internal wall of the cylinder 110; an actuator system 140 selectively inverting the cylinder 110 and driving the piston 120 to an initial position within the cylinder 110; a hopper 181 configured to receive whole portions of meat; a grinder 130 receiving whole portions of meat from the hopper, grinding whole portions of meat, and dispensing ground meat into the cylinder 110 in a grind position to drive the piston 120 from the initial position toward a target position; an arm selectively displacing the cylinder 110 between the grind position and a dispense position adjacent a cooking surface; and a controller 160. The controller 160: disables the grinder 130 and triggers the arm to displace the cylinder 110 from the grind position to the dispense position in response to displacement of the piston 120 from the initial position to the target position; triggers the actuator system 140 to invert the cylinder 110 in the dispense position; and triggers the actuator system 140 to drive the piston 120 toward the initial position (at the top of the cylinder) to discard a mass of ground meat from the cylinder 110 onto the cooking surface.

One variation of the system 100 includes: a cylinder 110 operable in an upright position and an inverted position; a piston 120 running within the cylinder 110 and defining a set of gas ports 122; a grinder 130 configured to grind meat and to dispense a quantity of ground meat onto the piston 120 in the cylinder 110 during a grind cycle, the cylinder 110 in the upright position during the grind cycle; an actuator system 140 configured to transition the cylinder 110 from the upright position to the inverted position during a dispense cycle to dispense the quantity of ground meat in the form of a patty from the cylinder 110; and a gas supply 150 configured to supply gas to the cylinder 110 behind the piston 120 at a first pressure during the grind cycle to limit ingress of ground meat into the gas ports 122 and configured to supply gas to the cylinder 110 behind the piston 120 at a second pressure greater than the first pressure during the dispense cycle to dislodge the quantity of ground meat from the piston 120.

2. Method

Figure 10:
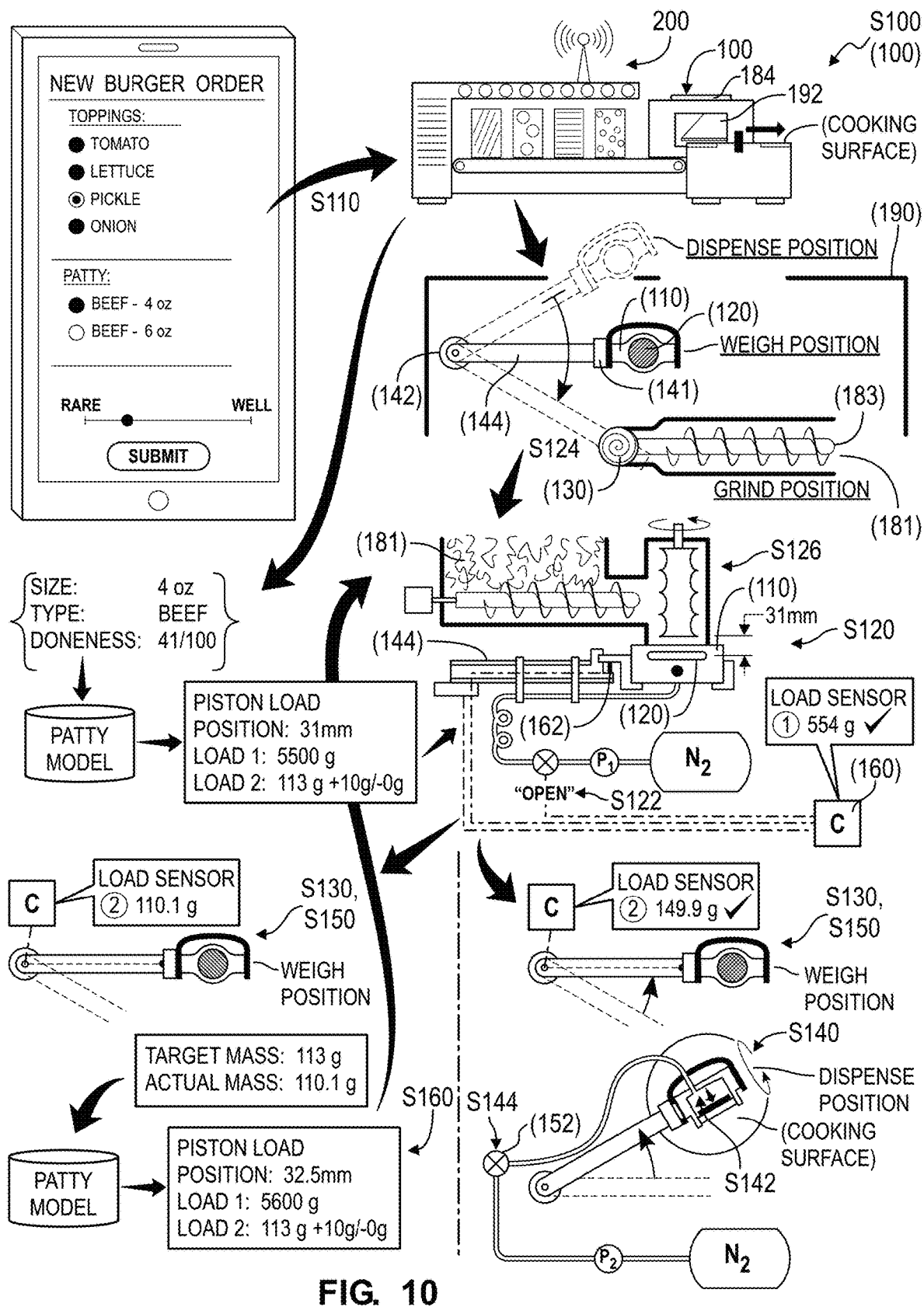
FIG. 10 is a flowchart representation of a method.

As shown in FIG. 10, a method S100 for grinding a meat patty includes: driving a piston within a cylinder into an initial position in Block S120; retracting the cylinder into a grind position in Block S124; actuating a grinder to dispense a mass of ground meat into the cylinder in Block S126; in response to displacement of the piston from the initial position to a target position by ground meat dispensed from the grinder, disabling the grinder in Block S130; advancing the cylinder into a dispense position adjacent a cooking surface in Block S140; inverting the cylinder in the dispense position in Block S140; and driving the piston to the initial position (at the top of the cylinder) to discard the mass of ground meat from the cylinder onto the cooking surface in Block S142.

One variation of the method S100 includes: receiving a food order specifying a meat patty in Block S110; driving a piston to a load position within a cylinder in Block S120, the load position offset below a top of the cylinder by a distance corresponding to a specified size of the meat patty; displacing gas into a chamber in the cylinder behind the piston at a first pressure, the piston perforated to release gas from the chamber in Block S122; positioning the cylinder in a grind position under a grinder in Block S124; dispensing a quantity of ground meat from the grinder into the cylinder during a grind cycle in Block S126; in response to a first load on the cylinder in the grind position exceeding a first threshold load, shifting the cylinder to a weigh position offset from the grinder in Block S130. This variation of the method S100 further includes, during a dispense cycle, in response to a second load on the cylinder in the weigh position exceeding a second threshold load corresponding to a target size of the meat patty: inverting the cylinder in Block S140; driving the piston toward the top of the cylinder in Block 142; and displacing gas into the chamber at a second pressure greater than the first pressure to dispense the quantity of ground meat, in the form of a patty, from the cylinder in Block S144.

3. Applications

The system 100 for grinding a meat patty (or the "system") functions to grind whole portions of raw meat, to dispense at least a minimum quantity (e.g., mass, weight, or volume) of ground meat into a cylinder, and to then release the contents of the cylinder onto an adjacent cooking surface for cooking prior to assembly with other ingredients into a hamburger. The system 100 can be a subsystem within an automated foodstuff assembly system 200 including one or more other subsystems to prepare, assemble, and deliver foodstuffs for and/or to consumers automatically. For example, the automated foodstuff assembly system 200 can include the patty grinding subsystem that grinds and presses custom hamburger patties from raw meat (e.g., based on custom patty orders), a patty grilling subsystem that grills patties (e.g., rare, medium, or well-done patties based on custom patty orders), a bun dispenser and slicing subsystem that slices buns, a bun buttering subsystem that applies butter to each side of sliced buns prior to toasting the halves of the bun, a bun toaster subsystem that toasts each side of the bun, a topping module that loads toppings onto bun heels (e.g., based on custom topping orders), a condiment subsystem that loads condiments onto the bun crown, and a boxing subsystem that closes completed hamburgers into paper boxes for delivery to patrons. The system 100 can similarly grind and press meat patties or veggie patties (e.g., from raw or cooked vegetables) for assembly into other types of assembled foodstuffs, such as sandwiches, hotdogs, burritos, tacos, or wraps according to custom food orders submitted by patrons to a restaurant housing an automated foodstuff assembly system 200. The system 100 can therefore be incorporated into an automated foodstuff assembly system 200 to grind and press meat (or veggie) patties from raw ingredients once an order for a hamburger (or other foodstuff) is submitted by a patron and in real-time as the patron's order is being fulfilled.

Generally, the system 100 implements Blocks of the method S100 in order to compensate for natural variability of density and composition (e.g., ratio of fat to protein) of meat to produce freshly-ground hamburger patties of at least a minimum weight or mass. In particular, upon conclusion of a grind cycle, the system 100 can weigh a quantity of ground meat dispensed into the cylinder, return the cylinder to a grind position to receive additional ground meat from the grinder if a minimum weight or mass is not met, and feed the weight of and the grind parameters for the quantity of ground meat forward to a next grind cycle in order to compensate for variations in meat density and composition when grinding and forming a next hamburger patty. For example, by calculating a running or weighted averaging of the weight of ground meat dispensed into the cylinder per unit of grind time (or per unit deflection of the cylinder, per unit displacement of the piston, etc. as described below) for a most recent set of (e.g., ten) hamburger patties formed by the system 100 following completion of each hamburger patty, the system 100 can calculate a grind duration (or a target deflection of the cylinder, a target displacement of the piston, etc.) to achieve a target weight of ground meat in a subsequent grind cycle with no underage and minimal overage from the target weight despite global variations in the density and composition of a mass of whole portions of meat loaded into the system 100.

The system 100 can also implement Blocks of the method S100 to grind and press hamburger patties of a particular density. In particular, the system 100 can grind a particular mass of meat into the cylinder, and the system 100 can compress this mass of meat into a hamburger patty of a particular volume yielding a density corresponding to a particular target compaction level. For example, to produce a raw hamburger patty suited to a well-done doneness level, the system 100 can grind and press a quantity of meat into a relatively short hamburger patty corresponding to a high level of compaction, thereby reducing a thermal distance between the center of the hamburger patty and its top and bottom surfaces and yielding a higher center temperature in the cooked hamburger patty for a given cook time and heat flux. In this example, to produce a raw hamburger patty of the same raw weight suited to a rare doneness level, the system 100 can grind and press a quantity of meat into a relatively tall hamburger patty corresponding to a low level of compaction, thereby increasing a thermal distance between the center of the hamburger patty and its top and bottom surfaces and yielding a lower center temperature in the cooked hamburger patty for the same cook time and heat flux. The system 100 can thus control a density (or level of compaction) of a quantity of ground meat dispensed into the cylinder based on a doneness level specified for the hamburger patty in a corresponding food order.

Furthermore, the system 100 can include a gas supply 150 that supplies a burst of air between the piston and a quantity of ground meat during a dispense cycle in order to dislodge the quantity of ground meat—in the form of a hamburger patty—from the cylinder. However, because the grinder may dispense meat into the cylinder at a relatively high pressure, the gas supply 150 can also maintain gas pressure behind the piston (or maintain a positive flow rate of gas past the piston) during a grind cycle in order to prevent or limit ingress of food material (e.g., ground meat, fluids) past the piston, which may otherwise spoil, interfere with motion of the piston, and/or necessitate more frequent or deeper cleaning between operating periods of the system 100.

The system 100 is described herein as a system for grinding whole portions of raw meat into ground hamburger patties. However, the system 100 can additionally or alternatively grind vegetables, fish, cooked or uncooked sausage, and/or any other raw, semi-cooked, or cooked ingredients into round patties, rectangular patties, or patties of any other geometry and can dispense a patty onto any other cooking surface, heating surface, bun, salad, or other container or surface.

4. Automated Food Assembly Apparatus

The system 100 can function as a subsystem within an automated foodstuff assembly apparatus including one or more other subsystems that automatically prepare, assemble, and deliver foodstuffs according to custom food orders submitted by local and/or remote patrons. For example, the automated foodstuff assembly apparatus can include: a bun dispenser and slicing subsystem that slices and dispenses a bun from a bun hopper; a bun buttering subsystem that applies butter to each side of the sliced bun prior to toasting the halves of the bun; a bun toaster subsystem that toasts each side of the bun; a topping module that loads a custom set of toppings in custom quantities onto the bun heel according to topping specifications in a custom food order received from a patron; a condiment subsystem that loads condiments onto the bun crown according to condiment specifications in the custom food order; the system 100 is a patty grinding system that grinds a quantity of raw meat (e.g., based on a custom patty size and a custom meat blend specified in the custom food order) and that presses this quantity of meat into a custom hamburger patty (e.g., to a compression level corresponding to a custom doneness level specified in the custom food order); a patty cooking subsystem that cooks the hamburger patty received from the patty grinding system according to the custom doneness level specified in the custom food order and dispenses the cooked hamburger patty onto the bun heel; and a boxing subsystem that closes the completed hamburger within a paper box for subsequent delivery to the corresponding patron.

The system 100 can grind and press hamburger patties (or veggie patties) from whole portions of raw meat (or from raw or cooked vegetables) and dispense these hamburger patties onto a cooking surface or into a cooking system. Once cooked, a hamburger patty ground and pressed by the system 100 can be combined with other ingredients to assemble a hamburger, a sandwich, a hotdog, a burrito, a taco, a salad, or a wrap, etc. according to a custom food order submitted by a patron to a restaurant, food truck, convenience store, grocery store, or food kiosk, etc. housing such as an automated foodstuff assembly apparatus. The system 100 can therefore be incorporated into an automated foodstuff assembly apparatus to automatically grind and press raw hamburger patties for immediate cooking, assembly into a hamburger (or other foodstuff), and delivery to a patron following submission of a custom food order by the patron.

5. Food Order

Figure 11:
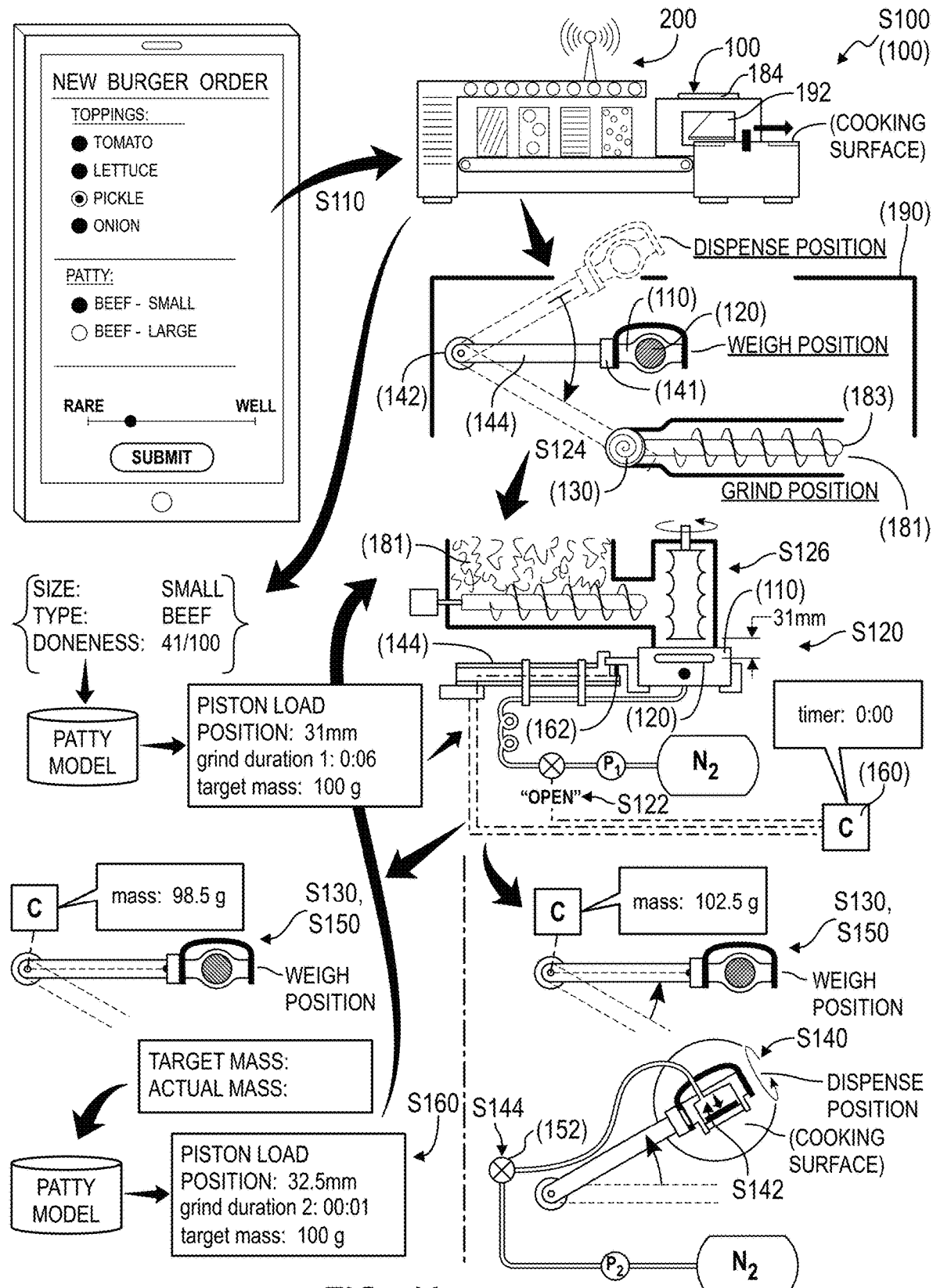
FIG. 11 is a flowchart representation of one variation of the method.

As shown in FIGS. 10 and 11, Block S110 of the method S100 recites receiving a food order specifying a meat patty. Generally, the system 100 functions to receive an order for a raw hamburger patty in Block S110 and then executes the subsequent Blocks of the method S100 to produce a raw hamburger patty according to the food order.

In one implementation, upon receipt of a hamburger order, the automated foodstuff assembly apparatus passes a request for a generic hamburger patty of a preset size (e.g., 100 grams+10 grams/–0 grams), of a preset doneness value (e.g., medium-well), and/or of a preset density or compaction level (e.g., 30 pounds per cubic foot) to the system 100; the system 100 thus receives this request for a generic hamburger patty in Block S110 and executes subsequent Blocks of the method S100 as described below to fulfill the request.

In another implementation, a patron can generate a hamburger order within an ordering interface executing on a mobile computing device (e.g., a smartphone) or at a local kiosk connected to the automated foodstuff assembly apparatus. Within the ordering interface, the patron can select a radio button corresponding to hamburger patty size (e.g., small (three ounces), medium (five ounces), or large (eight ounces) and manipulate a slider along a slider bar to select a doneness value for the hamburger patty in the patron's hamburger order, such as a quantitative doneness value between 1 and 100 along a 100-increment slider bar. Upon receipt of this hamburger order, the automated foodstuff assembly apparatus can distribute a request for a new hamburger patty—of the size and cooked to the doneness value specified in the food order—to the system 100 (e.g., to a controller 160) in Block S110, and the system 100 can calculate a load position for the piston, a grind duration for the grinder, and/or a deflection distance for the cylinder, etc., as described below, for a grind cycle to form a raw hamburger patty according to specifications defined in the new food order. However, the system 100 can receive an order, command, or request for a new hamburger patty in any other way and including any other specifications in Block S110.

6. Housing

As shown in FIGS. 1A and 1B, one variation of the patty grinding system includes a housing 190 that defines an enclosed volume configured to house the hopper and the grinder. The housing 190 can include two doors, including a first door arranged over the hopper and manually operable by an operator to dispense whole portions of raw meat into the hopper below, and including a second door 192 adjacent the arm and automatically operable by a door actuator or directly by the arm as the arm moves the cylinder (with fresh-ground patty) from the grind position within the housing 190 to the dispense position adjacent a cooking surface external the housing 190. The housing 190 can also include a funnel adjacent or extending from the upper door toward the hopper to guide whole portions of meat loaded through the upper door into the hopper below.

In one implementation, the system 100 includes a refrigeration unit 194 arranged within the housing 190. For example, the automated food assembly apparatus (including the system 100) can include a remote compressor, and the system 100 can include a single evaporator arranged within the housing 190 and coupled to the remote compressor by refrigerant supply and return lines, as shown in FIG. 1A. In this example, the evaporator can define a thin rectangular structure of large surface area and can be arranged within the housing 190 adjacent and facing the hopper. Alternatively, the system 100 can include an evaporator integrated into the hopper or integrated into the grinder to cool these components directly. In this variation, the housing 190 can also include internal baffles near its doors (described above) to reduce air mixing release of cooled air from the housing 190 when fresh whole portions of meat are loaded into the hopper through the upper door and when the arm drives the cylinder from the grind position, through the side door 192, to the dispense position.

7. Hopper

As shown in FIGS. 1A and 1B, one variation of the system 100 includes a hopper configured to store whole portions of meat. Generally, the hopper defines a container configured to store whole portions of meat and to dispense whole portions of meat into an inlet of the grinder. As described above, the hopper can be arranged within the housing with an open end supported below the upper door of the housing to collect whole portions of meat dispensed through the upper door, as shown in FIG. 1B.

Figure 2:
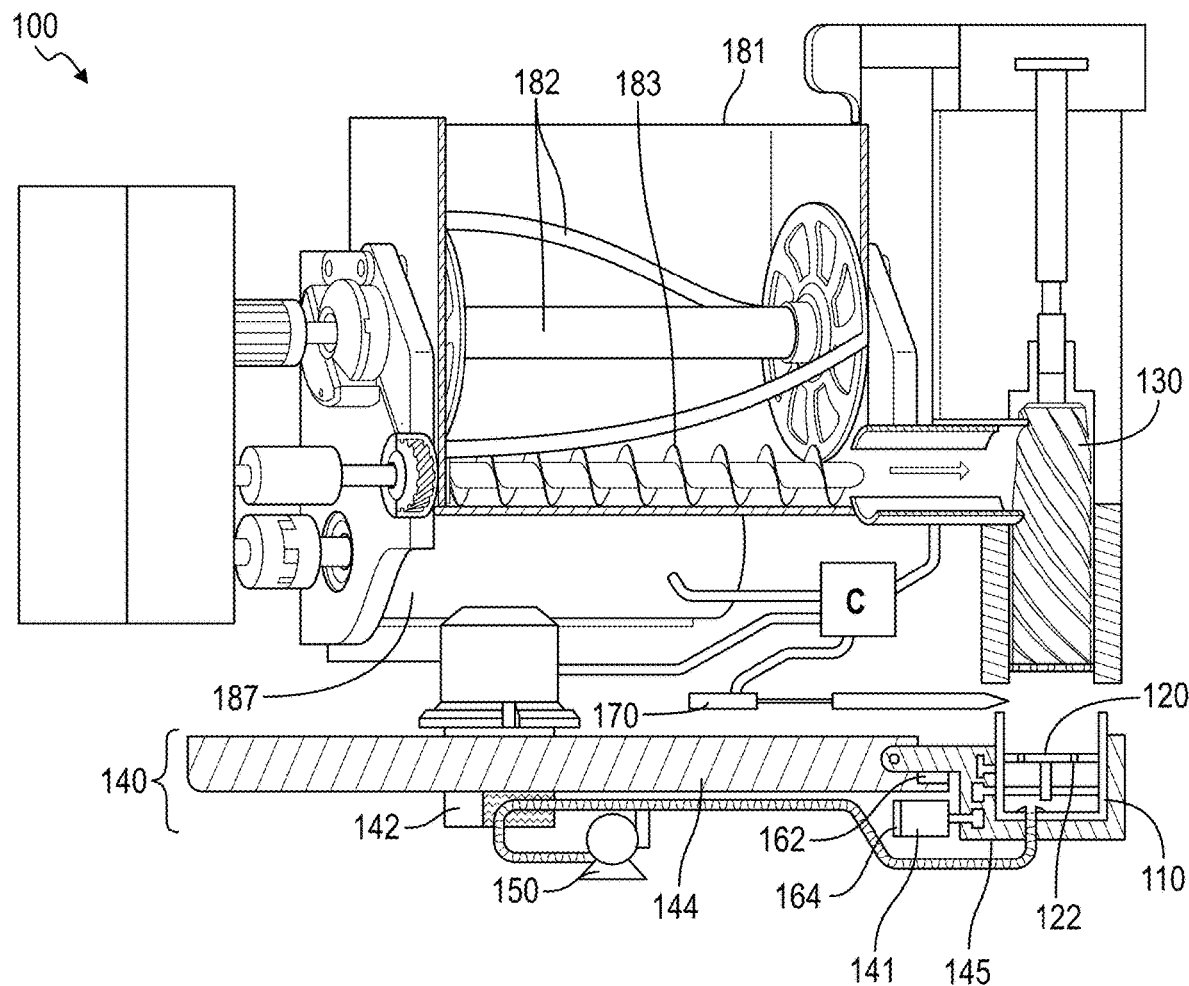
FIG. 2 is a schematic representation of one variation of the system.

The hopper can also include one or more augers 182 configured to mingle (or "mix") whole portions of meat—such as in the form of approximately one-inch-cubed cubes of beef, bison, chicken, or turkey—within the hopper and to drive whole portions of meat from the hopper toward the inlet of the grinder. In one example, the hopper includes an upper auger 182 and a lower auger 183, wherein the upper auger defines a double-helical beater that mixes whole portions of meat in the hopper, and wherein the lower auger (arranged below the upper auger) defines a screw that drives whole portions of meat laterally toward the grinder, as shown in FIG. 2. The upper and lower augers can be geared together by a gearbox and driven by a single motor, and the gearbox and motor can be isolated from a food contact zone within the housing, as shown in FIG. 3.

In one implementation, the gearbox includes two output shafts terminating at quick-release couplers that transiently engage corresponding input shafts of the upper and lower augers. In this implementation, the gearbox and motor can be substantially intransiently installed within the housing, and the hopper and upper and lower augers can be removed from the housing in-unit, disassembled, and cleaned—such as by hand or in a dishwasher—between periods of operation. For example, the hopper can be constrained within the housing by quick-release locks (as shown in FIG. 3) and the motor and gearbox can be supported on a linear tack aligned with the axes of the input shafts of the augers such that an operator can slide the motor and gearbox along the linear track to separate the flexible, quick release couplers of the gearbox from the input shafts of the augers, release the quick-release locks on the hopper, pivot the hopper from a support stand within the housing, and remove the hopper and upper and lower-augers in-unit.

The hopper can be intermittently loaded with whole portions of pre-seasoned meat by an (human) operator. Alternatively, the system 100 can include a seasoning module arranged within or external the housing, and the seasoning module can dispense seasonings (e.g., salt, pepper, garlic powder) onto an exposed surface of a patty once meat is ground into the cylinder, such as at an intermediate seasoning position between the grind position adjacent the grinder and the dispense position adjacent an external cooking surface. The seasoning module can also dispense seasonings into the cylinder following a dispense cycle and prior to a next grind cycle (i.e., when the cylinder is substantially empty) such that the bottom surface of the next hamburger patty thus formed is also coated with a seasoning, and the seasoning module can dispense additional seasoning onto the top of the hamburger patty, such as once the quantity of ground meat is confirmed in a subsequent weigh cycle and before the hamburger patty is dispensed in a dispense cycle. Alternatively, the grinder can dispense a sublayer of ground meat into the cylinder, the actuator system can move the cylinder to an intermediate seasoning position, the seasoning module can dispense seasonings onto the sublayer of ground meat, the actuator system can return the cylinder to the grind position, the grinder can dispense another sublayer of ground meat into the cylinder and over the layer of seasoning, and the system 100 can repeat this process to form a single patty with multiple layers of ground meat and seasoning before weighing the quantity of ground meat in the cylinder and dispensing the patty onto an adjacent cooking surface. Yet alternatively, the seasoning module can dispense a controlled amount (e.g., mass, weight, volume) of seasonings directly into the hopper, into a feed tube between the hopper and the grinder, or directly into the grinder as the grinder grinds whole portions of meat into the cylinder.

Figure 3:
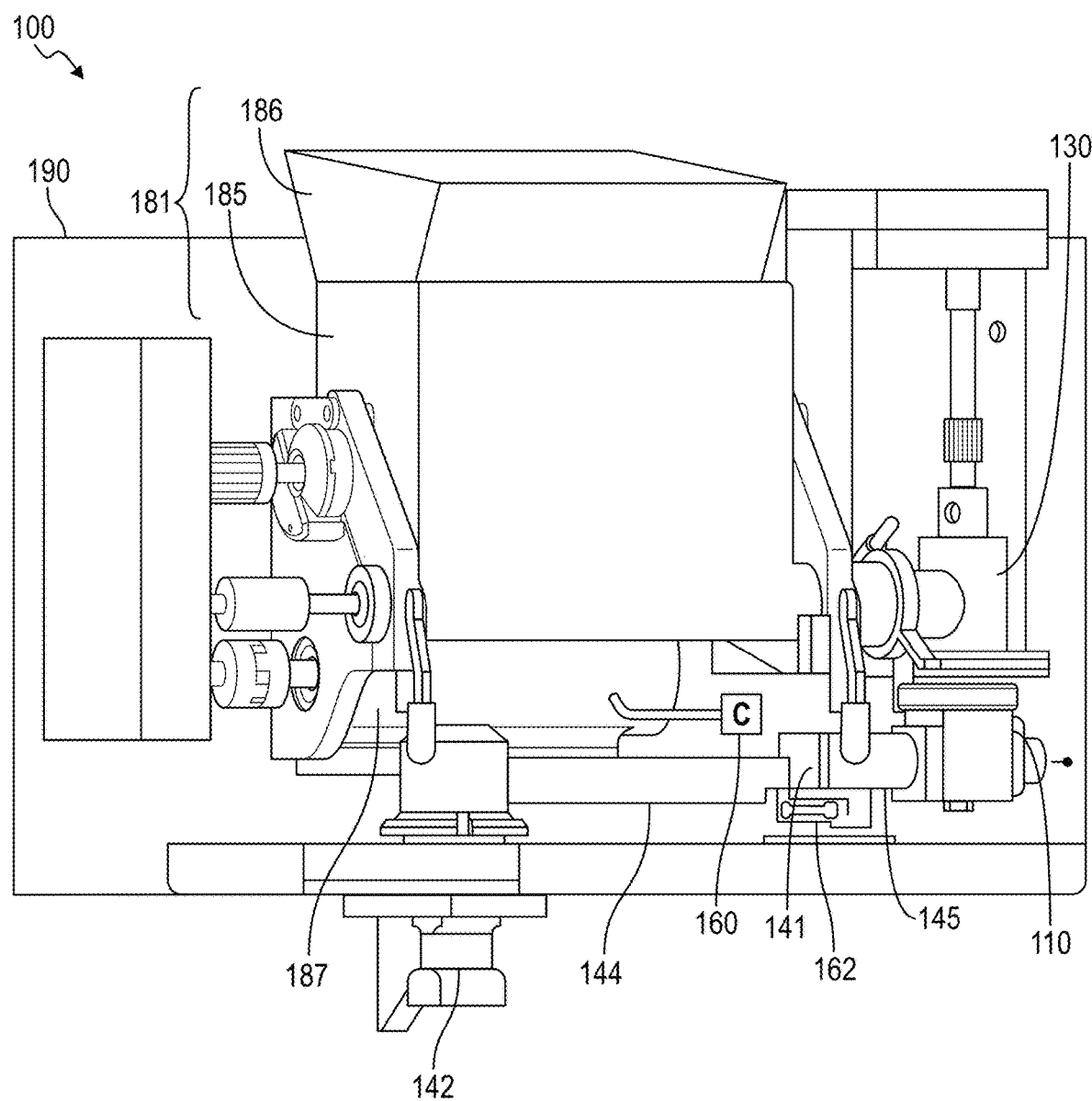
FIG. 3 is a schematic representation of one variation of the system.

In one implementation, the hopper includes an upper section and a lower section electrically isolated from the upper section and is configured to feed whole portions of meat downward toward the lower auger, as shown in FIG. 3. In this implementation, the system 100 (e.g., the controller 160 described below) can monitor electrical conductivity between the upper section of the hopper and the lower section of the hopper. Because raw portions of meat may conduct electricity, the system 100 can determine that the upper section of the hopper is empty if no electrical conductivity or low electrical conductivity is measured across the upper section and the lower section of the hopper, and the system 100 can then issue an alarm or other prompt to reload the upper section of the hopper. For example, when fully loaded with portions of meat, the upper section of the hopper can store a mass of meat sufficient to form 100 hamburger patties, and the lower section of the hopper can store a mass of meat sufficient to form 50 hamburger patties. In this example, when electrical contact between the upper and lower sections of the hopper is lost, the system 100 can determine that the hopper contains a mass of meat sufficient for approximately 50 hamburgers. The system 100 can then maintain a counter of hamburger patties subsequently formed and transmit a notification to an operator's mobile computing device to reload the hopper once the estimated mass of meat remaining in the hopper is sufficient for fewer than 20 hamburger patties. The system 100 can additionally or alternatively issue an audible or visible alarm on the automated foodstuff assembly apparatus to reload the hopper. Alternatively, the system 100 can track an amount of meat in the hopper based on a weight of the hopper, a weight of the housing, an output of a distance sensor arranged over the hopper, or in any other way or based on any other sensor output, and the system 100 can prompt an operator to reload the hopper in any other way and at any other suitable time during operation.

8. Grinder

As shown in FIGS. 2 and 3, the grinder 130 is configured to grind meat and to dispense a quantity of ground meat onto the piston in the cylinder during a grind cycle. Generally, the grinder 130 functions to receive whole portions of meat from the hopper, to grind these whole portions of meat, and to dispense ground meat into the cylinder supported in the grind position by the actuator system.

Figure 4:
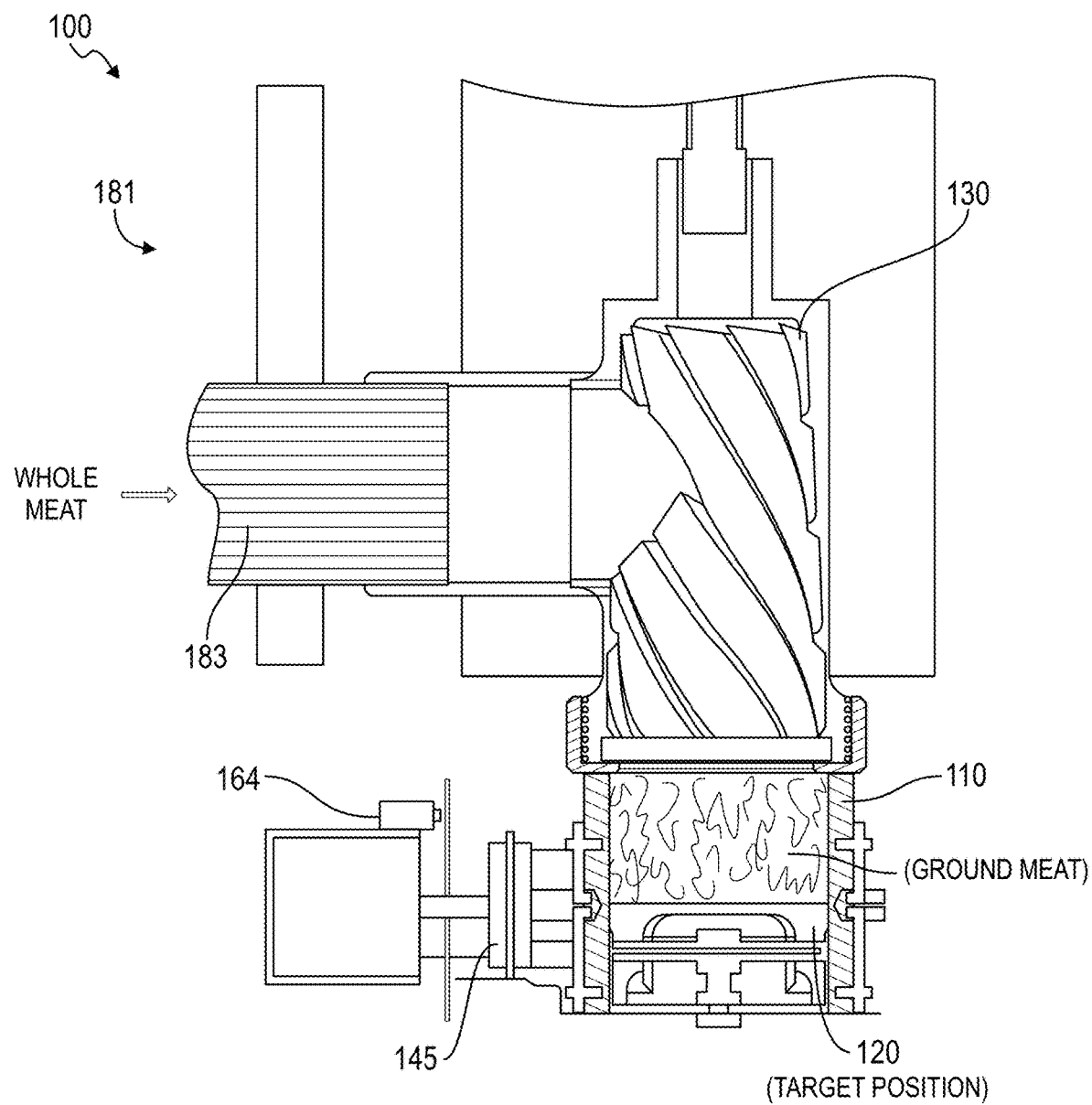
FIG. 4 is a schematic representation of one variation of the system.

In one implementation, the grinder 130 includes a (vertical) grinding screw configured to drive whole portions of meat—received from the hopper via the lower auger—through a die and into the cylinder (in the grind position) below, as shown in FIG. 4. In this implementation, the grinding screw can be driven by a motor via a gearbox and a quick-release coupler, and the motor and gearbox of the grinder 130 can be mounted substantially intransiently within or on the housing and isolated from the food contact zone within the housing. Like the hopper, the grinder 130 can be constrained within the housing by one or more quick-release locks (as shown in FIGS. 3 and 4) that can be released by an operator to remove the grinder 130 (e.g., grinding head, die, and grinding screw) from the housing. The grinder 130 can then be disassembled and cleaned—such as manually or in a dishwasher—between periods of operation.

However, the grinder 130 can be of any other type and can operate in any other way to grind or "mince" meat fed from the hopper and to deposit such ground or "minced" meat into the cylinder below (or beside) the outlet of the grinder 130.

9. Cylinder, Piston, and Actuator System

As shown in FIGS. 4, 5, 6, and 7, the system also includes: a cylinder 110 operable in a upright position and an inverted position; a piston 120 running within the cylinder 110 and defining a set of gas ports 122; and an actuator system 140 configured to transition the cylinder 110 from the upright position to the inverted position during a dispense cycle to dispense the quantity of ground meat in the form of a patty from the cylinder 110. Generally, the cylinder 110 can define a cylindrical internal wall; the piston 120 can slide within the cylinder 110 and can include a scraper that engages the cylindrical internal wall of the cylinder 110 to remove ground meat and other debris from the internal wall; and the actuator system 140 can selectively invert the cylinder 110 between upright and inverted positions, can selectively drive the piston 120 between a load position offset below the top of the cylinder 110 to receive ground meat from the grinder and an unload position proximal a top of the cylinder 110 to force a hamburger patty out of the cylinder 110, and can selectively position the cylinder 110 between a grind position and an dispense position.

Figure 5:
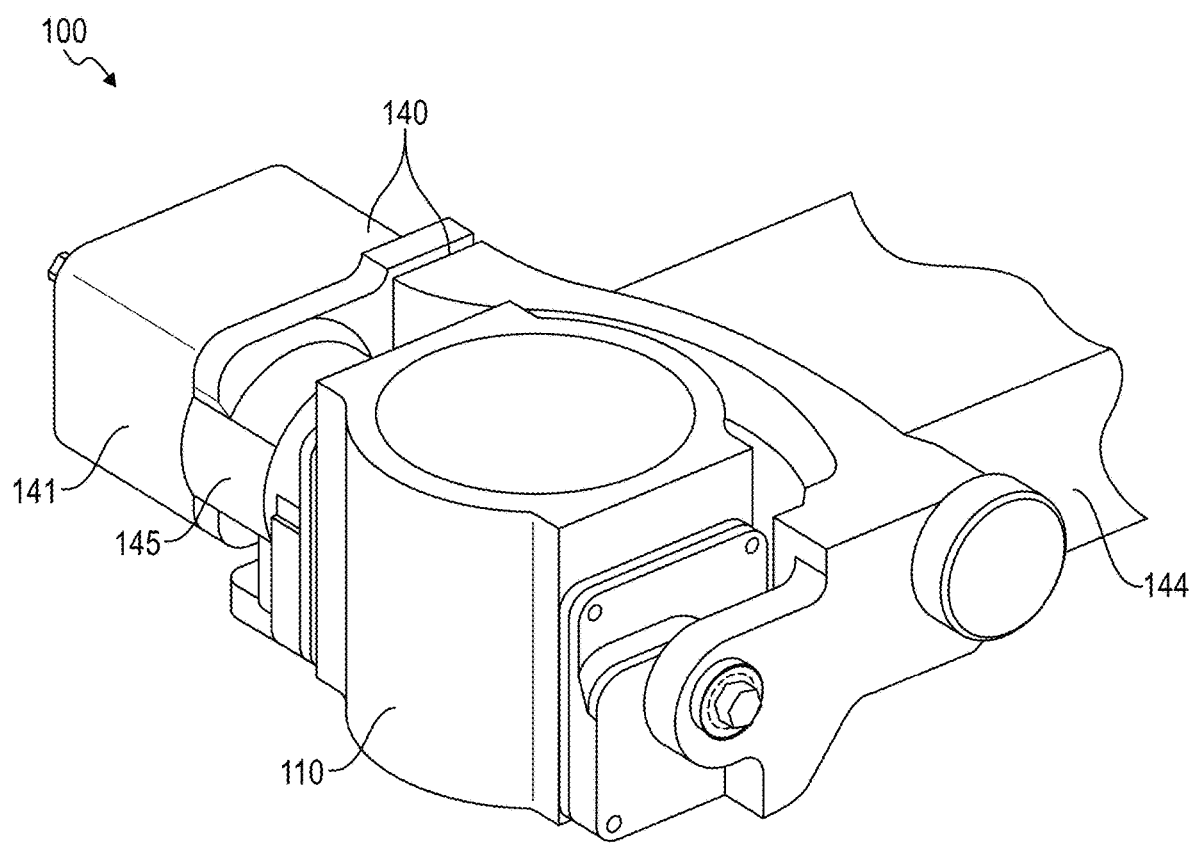
FIG. 5 is a schematic representation of one variation of the system.

As shown in FIG. 5, the cylinder 110 can define a cylindrical internal volume (i.e., an internal volume of constant circular cross-section) open on both ends. For example, the cylinder 110 can include a Teflon-coated aluminum cylinder 110 or an ultra-high-molecular-weight polyethylene cylinder 110. However, the cylinder 110 can define any other geometry and can be constructed of any other suitable material or combination of materials. The actuation system can include an arm (or beam, or boom); the cylinder 110 can be supported on a distal end of the arm, as described below, and can be driven between an upright position to receive ground meat from the grinder and an inverted position to dispense a patty onto an adjacent cooking surface by the actuator system 140. For example, the cylinder 110 can be hung on a first shaft pivotably mounted on the distal end of the arm substantially perpendicular to the central axis of the cylinder 110, and the cylinder 110 can thus pivot about the axis of the first shaft between the upright and inverted positions, as shown in FIG. 5.

Figure 6:
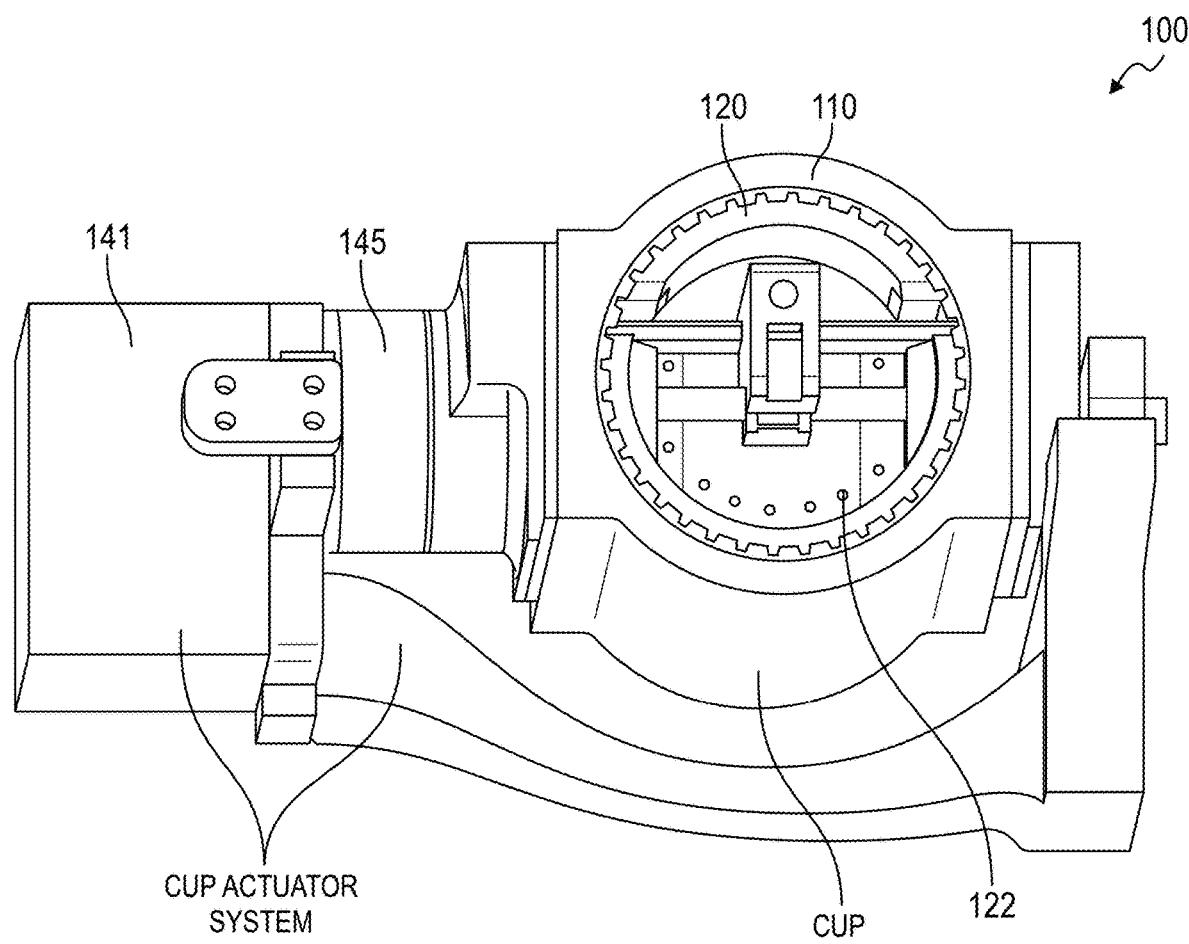
FIG. 6 is a schematic representation of one variation of the system.
Figure 7:
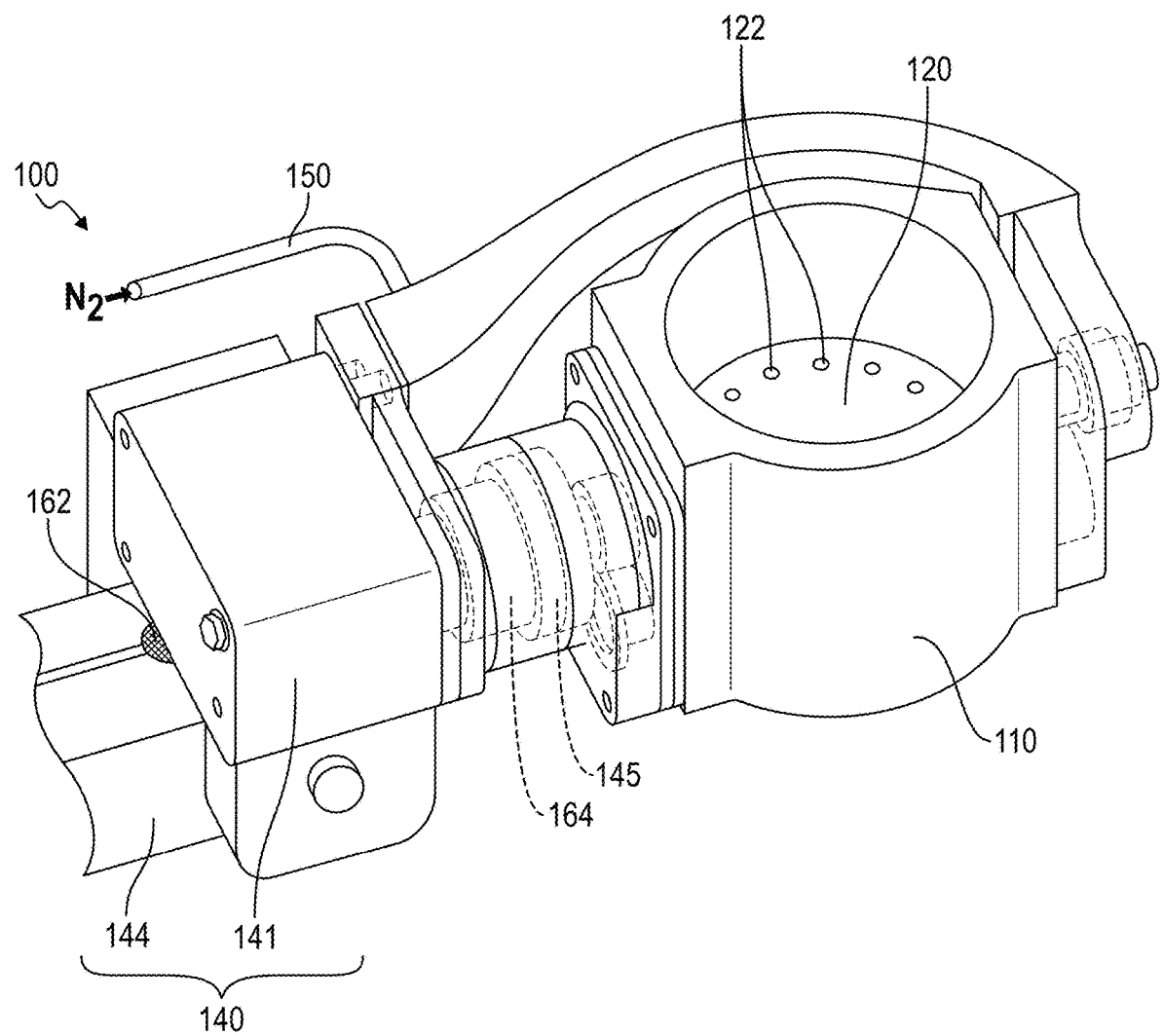
FIG. 7 is a schematic representation of one variation of the system.

As shown in FIG. 7, the piston 120 runs along the interior wall of the cylinder 110 and can include a scraper, O-ring, and/or other seal or scraper configured to remove fat and other deposits from the interior wall of the cylinder 110 as the piston 120 is driven from the load position to the unload position. The piston 120 also functions to drive a patty out of the cylinder 110 and onto an adjacent cooking surface as the piston 120 is driven—by the actuator system 140—from the load position to the unload position within the cylinder 110. For example, the piston 120 can be coupled by a linkage (e.g., a crank and a connecting rod) to a second shaft parallel and adjacent the first shaft, as shown in FIG. 6, wherein the actuator system 140 similarly drives the piston 120 linearly through the cylinder 110 via the second shaft. In one implementation, the piston 120 defines a smooth, Teflon-coated, flat surface facing the top of the cylinder 110. In another implementation, the piston 120 defines a perforated surface facing the open end of the cylinder 110 to yield a relatively low total surface area in contact with ground meat across the face of the piston 120; the gas supply 150 line can be fluidly coupled to the cylinder 110 behind the piston 120, and the system 100 can trigger a valve to release compressed gas into a chamber behind the piston 120; this gas can then travel through perforations in the piston 120 to separate the ground meat from the face of the piston 120 when dispensing the patty onto an adjacent cooking surface, as described below. However, the piston 120 can define any other surface geometry.

The actuator system 140 functions to invert the cylinder 110 between the upright and inverted positions and to drive the piston 120 between the load position and the unload position. In one implementation, the actuator system 140 includes a primary actuator 141 (e.g., a rotary motor) and a planetary gearbox 145, as shown in FIGS. 4 and 7. In this implementation, the output shaft of the primary actuator 141 (e.g., an electric, pneumatic, or hydraulic motor) can be mechanically coupled to the ring gear of the planetary gearbox 145, the first shaft (supporting the cylinder 110) can be coupled to the sun gear of the planetary gearbox 145 via a planet arm, and the second shaft (connected to the piston 120 via the linkage) can be coupled to the planet gears of the planetary gearbox 145. The seal and/or scraper arranged about the perimeter of the piston 120 can yield a mechanical resistance to translation of the piston 120 within the cylinder 110 (and therefore resistance to rotation of the second shaft) that exceeds a total mechanical resistance to rotation of the first shaft and the cylinder 110 assembly. Thus, with the cylinder 110 in the upright position and the piston 120 in the load position, the seal can constrain the piston 120 in the cylinder 110 and effectively lock the position of the planet arm relative to the first shaft such that, when the primary actuator 141 initially applies a torque to the ring gear, sun gear, planet gears, and planet arm, rotate in unit, thereby rotating the first shaft and inverting the cylinder 110 from the upright position to the inverted position with the piston 120 remaining in the same position within the cylinder 110. However, once the cylinder 110 reaches the inverted position and contacts an invert stop, continued application of torque by the primary actuator 141 into the gearbox 145 can overcome mechanical resistance between the piston 120 and the cylinder 110 and thus drive the piston 120 from the load position toward the unload position. In particular, with the cylinder 110 thus driven against the invert stop, the sun gear in the planetary gearbox 145 can be locked against further rotation as the ring gear continues to rotate under torque applied by the primary actuator 141, and the planet gears and the planet arm can thus rotate (at some ratio of rotation) about the sun gear, thereby rotating the second shaft relative to the first shaft and driving the piston 120 toward the unload position within the cylinder 110. For example, with the arm supporting the cylinder 110 in the upright position over a cooking surface and with a metered quantity of ground meat loaded in the cylinder 110, the primary actuator 141 can drive the planetary gearbox 145 to first invert the cylinder 110 in Block S140 and to then drive the piston 120 from the load position within the cylinder 110 to the unload position within the cylinder 110 in Block S142, thereby forcing the patty out of the cylinder 110 and onto the cooking surface.

Once the patty is thus released from the cylinder 110 and the piston 120 reaches the unload position, the primary actuator 141 can reverse. However, resistance between the piston 120 and the inner wall of the cylinder 110 can persist such that the first and second shafts are effectively locked together, thereby causing the first shaft to rotate and the cylinder 110 to return to the upright position with the piston 120 remaining in the unload position as the primary actuator 141 rotates in the reverse direction. When the cylinder 110 returns to the upright position and contacts an upright stop, the primary actuator 141 can cease rotation, and the arm can return the cylinder 110 to the grind position adjacent the grinder where a receiver adjacent the output of the grinder constrains the cylinder 110. When the grinder subsequently outputs ground meat into the cylinder 110, the ground meat can force the piston 120 from the unload position downward toward the load position, thereby rotating the second shaft, the planet gears, the ring gear, and the output shaft of the primary actuator 141, as described below.

Alternatively, with the cylinder 110 in the dispense position, returned to the upright position, and constrained against further rotation in the reverse direction by an upright stop, the sun gear in the planetary gearbox 145 can cease rotation, and the planet gears and planet arm can rotate with the ring gear as the primary actuator 141 continues to reverse direction, thereby rotating the second shaft and retracting the piston 120 toward the load position, as described below.

As described below, the system 100 can include a controller 160 (shown in FIG. 1A) that intermittently sets forward and reverse speeds of the primary actuator 141 based on the position of cylinder 110 and/or the position of the piston 120 within the cylinder 110. In one example, the controller 160 monitors torque output of the primary actuator 141 to determine the position of the cylinder 110 and/or the piston 120. In this example, for the cylinder 110 initially in the upright position and the piston 120 initially in the load position at the beginning of a dispense cycle, the controller 160 can correlate a first near-step increase in torque output of the primary actuator 141 with the cylinder 110 hitting the invert stop in Block S140, and the controller 160 can then correlate a subsequent near-step increase in torque output of the primary actuator 141 with the piston 120 reaching the unload position and hitting a travel limit in Block S142. In this example, the controller 160 can also correlate a drop in torque output of the primary actuator 141 after the first step increase in torque output and before the second increase in torque output with release of a patty from the cylinder 110. Similarly, for the cylinder 110 initially in the inverted position and the piston 120 initially in the unload position with the primary actuator 141 rotating in the reverse direction, the controller 160 can correlate a first near-step increase in torque output of the primary actuator 141 with the cylinder 110 hitting the upright stop, and the controller 160 can thus cease operation of the primary actuator 141 and trigger the actuation system to retract the cylinder 110 into the grind position.

Alternatively, the actuator system 140 can include one or more binary limit switches, such as one binary limit switch that changes its output state when the cylinder 110 enters the upright position, one binary limit switch that changes its output state when the cylinder 110 enters the inverted position, one binary limit switch that changes its output state when the piston 120 enters the unload position, and one binary limit switch that changes its output state when the piston 120 enters the load position, and the controller 160 can set the speed and rotational direction of the primary actuator 141 according to outputs of these limit switches. Yet alternatively, the actuator system 140 can include one or more encoders coupled to the primary actuator 141, to the ring gear, to the sun gear, to a planet gear, to the first shaft, and/or to the second shaft, etc., and the controller 160 can sample the encoders to determine the positions of the cylinder 110 and the piston 120 and can adjust the speed and direction of the primary actuator 141—coupled to the cylinder 110 and to the piston 120—accordingly during a dispense cycle in Blocks S140 and S142.

The primary actuator 141 can include a servo motor, a stepper motor, a rotary pneumatic actuator, a rotary hydraulic actuator, or any other type of actuator suitable to drive the cylinder 110 between the upright and inverted positions and to drive the piston 120 between the load and unload positions. The actuator system 140 can also include multiple actuators, such as one electric motor that transitions the cylinder 110 between the upright position and the inverted position independent of a second electric motor that transitions the piston 120 between the load position and the unload position. The actuator(s) of the actuator system 140 can be supported on the arm, such as adjacent the cylinder 110. Alternatively, the actuator(s) of the actuator system 140 can be remote from the cylinder 110, such as mounted on the exterior of the housing and coupled to the cylinder 110 and the piston 120 via one or more flexible cables.

However, the cylinder 110, the piston 120, and the actuator system 140 can be of any other form and can function in any other way to receive a quantity of ground meat during a grind cycle in Block S126 and to unload a hamburger patty during a dispense cycle in Blocks S140 and S142.

10. Arm

As described above, the system 100 can further include an arm 144 that supports the cylinder, and the actuation system can manipulate the arm 144 to selectively displace the cylinder between the grind position adjacent the grinder and the dispense position adjacent a cooking surface. Generally, the arm 144 functions to support the cylinder on its distal end in both the grind position to receive ground meat during a grind cycle and in the dispense position to release ground meat—in the form of a hamburger patty onto an adjacent cooking surface external the housing—during a dispense cycle.

The actuation system can further include a secondary actuator 142, such as a rotary or linear motor, configured to rotate, extend, or retract the arm 144 from the grind position to the dispense position and vice versa. For example, the secondary actuator 142 can include a servo motor, including an absolute encoder, and the proximal end of the arm 144—opposite the cylinder—can be mounted to an output shaft of the secondary actuator 142; when actuated, the second motor can thus pivot the arm 144 to move the cylinder between the grind and dispense positions.

In the foregoing implementation, the arm 144 sweeps the cylinder along an arc between the grind position and the dispense position. In this implementation, the arm 144 can pivot a proximal end opposite the cylinder and can be driven by a rotary actuator coupled to the proximal end of the arm 144 by a shaft. An (optical) encoder can be directly coupled to the shaft or driven off the shaft by a clutched or sprung coupling. In this implementation, the arm 144 can also include a counterweight—opposite the cylinder from the shaft—that compensates for the weight of the cylinder and the actuator system. In this implementation, the side door 192 can be hinged from the housing, and the arm 144 can pivot the side door 192 open when transitioning the cylinder from the grind position to the dispense position. Alternatively, the side door 192 can be coupled to the arm 144 and seal against the housing when the arm 144 is in the grind position, and the door 192 can separate from the housing as the arm 144 pivots into the dispense position.

In another implementation, the arm 144 shuttles the cylinder linearly from the load position, through the side door 192 of the housing, and into the dispense position adjacent an external cooking surface. In this implementation, the arm 144 can include a linear slide that supports the cylinder (and the primary actuator), and the secondary actuator 142 can include a linear actuator that extends and retracts the linear slide between the grind and dispense positions.

11. Load Sensor

In one variation, the system 100 further includes a load sensor 162 configured to output a signal corresponding to a mass or weight of contents in the cylinder. The system 100 can sample the load sensor 162 during a weigh cycle, described below, to confirm that at least a threshold amount of ground meat has been loaded into the cylinder prior to a dispense cycle. The system 100 can additionally or alternatively sample the load sensor 162 during a grind cycle to track deflection of the cylinder away from the outlet of the grinder, which may then be correlated with a complete loading of the cylinder and/or a level of compaction or density of ground meat in the cylinder, as described below.

In one implementation, the cylinder, piston, and primary actuator are constructed in a cylinder assembly hinged to the distal end of the arm, and the system 100 further includes a load cell arranged between the distal end of the arm and the cylinder assembly and defining a pivot stop for the cylinder assembly. In this implementation, the weight of the cylinder assembly and the contents of the cylinder can compress the load cell, and the load cell can thus output a signal corresponding to this weight of the cylinder assembly and its contents. In a similar implementation, the arm can include a post extending vertically from its distal end, the load cell can be mounted to the distal end of the arm adjacent the post, and the cylinder assembly can include a linear slide that accepts and slides vertically along the post and can rest on the load cell; the load cell can thus output a signal corresponding to the weight of the cylinder assembly and its contents.

In another implementation, the arm defines a cantilevered beam, the cylinder assembly is mounted to the distal end of the cantilevered beam, and the load sensor 162 includes a strain gauge arranged on the beam, as shown in FIGS. 2 and 3. The controller can thus sample the load sensor 162 to determine an amount (e.g., a mass, a weight) of ground meat contained in the cylinder following a grind cycle.

In the variation described below in which the system 100 confirms completion of a grind cycle based on deflection of the arm, the load sensor 162 can exhibit a relatively wide dynamic range. For example, the load sensor 162 can exhibit a resolution of approximately one-tenth gram over a range of 50 grams to 250 grams of mass loaded into the cylinder. In this example, the load sensor 162 can also exhibit a resolution of approximately 5 grams over a range of 5000 grams to 10,000 grams of load applied by the grinder to the cylinder as the grinder dispenses ground meat into the cylinder during a grind cycle. The system 100 (e.g., the controller) can thus sample the single load cell during a grind cycle and a subsequent dispense cycle to confirm completion of a grind cycle and to confirm sufficient loading of the cylinder with ground meat, respectively. Alternatively, in this variation, the system 100 can include multiple load sensor 162s, such as including: a strain gauge arranged along the arm and exhibiting a dynamic range sufficient to track deflection of the arm during a grind cycle; and a load cell arranged between the distal end of the arm and the cylinder assembly and exhibiting a dynamic range sufficient to weigh the cylinder when the cylinder is arranged in a weigh position offset from the grinder during a weigh cycle. However, the system 100 can include any other number and type of load sensors arranged in any other way.

12. Shear Assembly

One variation of the system 100 further includes a shear assembly 170 interposed between the outlet of the grinder and the rim top of the cylinder (in the grind position), operable between a retracted position and an advanced position, and configured to transition from the retracted position to the advanced position following actuation of the grinder during a grind cycle to separate a quantity of ground meat dispensed into the cylinder from ground meat remaining across the outlet of the grinder.

In one implementation, the shear assembly 170 includes: a shear plate; and a linear actuator configured to drive a leading edge of the shear plate across the outlet of the grinder to sever ground meat in the cylinder from the grinder and configured to retract the shear plate prior to a next grind cycle to enable the cylinder to again be loaded with ground meat. In this implementation, the actuator can retract the shear plate to permit ground meat to pass from the grinder into the cylinder below, and the shear actuator can advance the shear plate into the advanced position between the cylinder and the grinder to sever ground meat in the cylinder from ground meat at the output of the grinder prior to actuation of the secondary actuator to move the cylinder from the grind position to the weigh position. The leading edge of the shear assembly 170 can include a straight, elliptical, or semicircular blade with a straight or serrated profile, and the shear actuator can rapidly advance the shear plate into the advanced position to separate the contents of the cylinder and the contents of the grinder. In one example, the shear assembly includes a blade that defines a concave semicircular leading edge of radius equal to the internal radius of the cylinder. In this example, this profile of the blade can enable the blade to cleanly shear ground meat from the outlet of the grinder with the leading edge of the blade pushing a minimal amount of ground meat out of the cup. The leading edge of the blade can also define a single bevel facing the cup such that a planar surface of the blade and its leading edge—facing the outlet of the grinder—contact the grinder when actuated to yield relatively smooth operation of the shear assembly and cleaner shearing of ground meat from the grinder. Furthermore, the blade can extend laterally beyond the width of outlet of the grinder and beyond the inlet of the cup such that the blade, when actuated does not catch on an edge of the grinder or cup throughout its range of motion Alternatively, the shear assembly 170 can include a rotary meat-slicing blade and an actuator configured to pass the rotary meat-slicing blade through a gap between the outlet of the grinder and the cylinder while the rotary meat-slicing blade rotates. Yet alternatively, the shear assembly 170 can include a hot wire and an actuator configured to pass the hot wire through the gap between the outlet of the grinder and the cylinder as current passing through the hot wire heats the hot wire. However, the shear assembly 170 can include any other structure and actuator configured to separate ground meat dispensed into the cylinder from meat remaining in the grinder.

13. Grind Cycle and Weigh Cycle

Block S124 of the method S100 recites positioning the cylinder in a grind position under a grinder; Block S126 of the method S100 recites dispensing a quantity of ground meat from the grinder into the cylinder during a grind cycle; and Block S130 of the method S100 recites, in response to a first load on the cylinder in the grind position exceeding a first threshold load, shifting the cylinder to a weigh position offset from the grinder. Generally, the system 100: positions the cylinder under (or adjacent) the outlet of the grinder in preparation to receive ground meat from the grinder in Block S124; actuates the grinder to grind whole portions of raw meat received from the hopper and to dispense this raw ground (or "minced") meat into the cylinder during a grind cycle; and executes a weigh cycle in Block S130 to confirm that a sufficient quantity of ground meat was loaded in the cylinder.

13.1 Piston Displacement as Control

In one variation, the system 100 further includes a position sensor 164 configured to output a signal corresponding to a position of the piston within the cylinder. In this variation, the actuator system can return the piston to an unload position in preparation for a next grind cycle, and the grinder can cease dispensation of ground meat into the cylinder in response to an output of the position sensor 164 indicating displacement of the piston downward to a load position (or a "target position) by ground meat dispensed into the cylinder by the grinder. Generally, in this variation, the system 100 tracks displacement of the piston within the cylinder due to injection of ground meat into the cylinder by the grinder and concludes a grind cycle when the piston reaches a load position corresponding to a target size (e.g., weight, mass, volume) of a hamburger patty.

In this variation, the system 100 can also include a controller that receives a request for a new hamburger patty (e.g., in the form of a food order) in Block S110 and then selectively actuates various actuators within the system 100 to execute a grind cycle accordingly in Blocks S124 and S126. In one implementation, following a previous dispense cycle, the controller triggers the actuation system to return the cylinder to the grind position in Block S124 in preparation for a next grind cycle. With the cylinder now empty and supported in the grind position, the controller triggers a relay to supply power to the grinder in Block S126 in response to a call for a new hamburger patty in Block S110. While in operation, the grinder dispenses ground meat into the cylinder, which forces the piston downward and away from the outlet of the grinder, and the controller repeatedly samples the position sensor 164 (e.g., an encoder coupled to the primary actuator or to the gearbox) to track the position of the piston within the cylinder. Once the piston reaches a preset or recalculated load position (or approaches or passes the load position, etc.), the controller ceases operation of the grinder to cease dispensation of ground meat into the cylinder and then initiates a weigh cycle.

In this implementation, the controller can calculate or set the load position as a target displacement distance of the piston from the unload position (a target offset distance below the rim of the cylinder) to achieve a hamburger patty of a target weight, mass, or volume. For example, the controller can calculate a target displacement of the piston by ground meat dispensed into the cylinder based on the known cross-sectional area of the cylinder and historic densities of ground meat loaded into the cylinder (or a preset static ground meat density prediction), and then trigger the grinder to dispense ground meat into the cylinder until the piston is driven down to this target position during a grind cycle. In this implementation, the controller can maintain the actuator system in a deactivated (e.g., unpowered) state and thus allow the piston, primary actuator, and gearbox or other linkage therebetween to passively resist deflection by ground meat dispensed into the cylinder. Once the piston is driven down to this load position and once the grinder ceases operation, the controller can trigger the shear assembly to advance the shear plate to separate ground meat in the cylinder from the ground meat at the outlet of the grinder. The controller can then trigger the secondary actuator to move the cylinder from the grind position to a weigh position offset (e.g., laterally) from the outlet of the grinder and can sample the controller 160 to confirm that at least a minimum weight of ground meat was dispensed into the cylinder in Block S130. In this implementation, if less than the minimum quantity (e.g., weight) of ground meat is detected in the cylinder, the controller can trigger the secondary actuator to return the cylinder to the grind position, can calculate an adjusted target load position based on a difference between the actual and target amounts of dispensed ground meat for the grind cycle, and can trigger the relay to again supply power to the grinder until sufficient ground meat is dispensed into the cylinder to drive the piston to the adjusted target load position.

The controller can repeat this process to weigh the cylinder and its contents, calculate an adjusted load position, and add additional ground meat to the cylinder until the target quantity of ground meat in the cylinder is achieved.

In one example, in response to receipt of a request for a hamburger patty at least 100 grams in mass (i.e., a "target mass") in Block S110, the controller can set the target load position at 20.0 millimeters offset from the unload position (e.g., at which the face of the piston is offset 20.0 millimeters below the rim of the cylinder) based on a known cross-sectional area of the cylinder and a preset approximate density of the type of meat stored in the hopper to achieve a quantity of meat between 100 grams and 110 grams in mass when the piston is driven to the load position by ground meat dispensed into the cylinder. The controller then actuates the grinder in Block S126 until the piston is displaced 20.0 millimeters from the unload position to the target load position by ground meat dispensed into the cylinder during the grind cycle. Upon completion of the grind cycle, the controller triggers the secondary actuator to shift the cylinder to the weigh position and samples the controller 160 to record a mass (or weight) of ground meat in the cylinder. In this example, if the output of the controller 160 indicates that only 96 grams of meat is contained in the cylinder following the grind cycle, the controller: adjusts the target load position to 21.0 mm offset below the unload position, which corresponds to a new prediction of 100.8 g of ground meat in the cylinder upon realization of the adjusted load position; triggers the secondary actuator to return the cylinder to the grind position; and again actuates the grinder until the piston is driven down to the adjusted load position. The controller then executes another weigh cycle to weigh the contents of the cylinder in Block S130. If the controller 160 indicates that greater than 100 grams of ground meat are contained in the cylinder, the controller can initiate a dispense cycle in Blocks S140, S142, and S144 to release the quantity of ground meat—in the form of a hamburger patty—onto a cooking surface for subsequent cooking. However, if the controller 160 indicates that less than 100 grams of ground meat are contained in the cylinder, the controller can repeat the foregoing process until the target quantity of ground meat is achieved.

Furthermore, in this implementation, the controller can record the last adjusted load position to achieve the target quantity of ground meat and can implement this last adjusted load position as the first load position in a next grind cycle for a subsequent order for a hamburger patty of the same weight (or mass). Similarly, if the actual weight (or mass) of a previous hamburger patty was (significantly) greater than the target weight (or mass) for the previous hamburger patty, the controller can also calculate an adjusted load position for a next hamburger patty that compensates for this overage in the previous hamburger patty. The controller can also calculate an average weight (or mass) of ground meat per unit distance that the piston is displaced across a sequence of hamburger patties and can calculate a target load position for a next hamburger patty accordingly. For example, the system 100 can calculate the average weight of ground meat dispensed per unit distance of piston displacement for a last ten hamburger patties formed by the system 100 with the weight of the most-recent hamburger patty weighted more than the weight of a previous hamburger patty. The controller can also update a lookup table or parametric model to reflect the actual weight of ground meat dispensed per unit of displacement of the piston during the last grind cycle, as described below. The controller can therefore implement closed loop feedback controls and/or feed-forward controls to calculate a target load position—for a next hamburger patty—that accounts for natural variations in density and composition of meat to maintain a high initial accuracy of weight (or mass) of ground meat dispensed into the cylinder for each subsequent hamburger patty.

13.2 Piston Displacement as Control with Density Control

In another implementation, the system 100 actively controls the primary actuator to resist displacement of the piston during a grind cycle in order to control a pressure within the cylinder as the grinder discharges ground meat into the cylinder. Generally, the system 100 can implement methods and techniques to control the density of a quantity of ground meat, such as to achieve a preset hamburger patty density or to achieve a hamburger patty density corresponding to a doneness level specified in a custom food order. In particular, by actively controlling displacement of the piston away from the outlet of the grinder during a grind cycle, the system 100 can force ground meat discharged from the grinder to compress between the piston and the outlet of the grinder, thereby reducing voids (e.g., air pockets) within the quantity of dispensed ground meat and yielding control over the density of this quantity of ground meat in the cylinder.

In this implementation, the controller can initiate a grind cycle with the piston in the unload position at or proximal the top of the cylinder. Throughout the dispense cycle, the controller can: monitor the current draw of the primary actuator coupled to the piston; sample a position sensor 164 (e.g., an optical encoder) coupled to the primary actuator (or to the piston, to the gearbox); and transform the current draw of the primary actuator and the position of the piston within the cylinder into a predicted density of the quantity of ground meat in the cylinder. For example, the controller can pass the current draw of the primary actuator and the position of the piston into a lookup table or into a parametric model defining a relationship between these current draw, piston position, and ground meat density for the type of meat currently loaded into the hopper.

In a similar example, the controller can calculate a torque output of the primary actuator based on the current draw of the primary actuator and then calculate a pressure within the cylinder based on the torque output of the primary actuator, a gear reduction between the primary actuator and the piston, the cross-sectional area of the piston, and the position of the piston within the cylinder (e.g., given that the torque output by the primary actuator is transferred into a linear force at the piston as a function of the position of a crank connecting the same). In this example, the controller can select a target density of the hamburger patty based on a doneness level specified for the hamburger patty, can access or calculate a target pressure within the cylinder correlated with this target density, and can then modulate an amount of power supplied to the primary actuator in order to achieve this target pressure within the cylinder.

The system 100 can set a target density for the hamburger patty, such as a general target density or a target density corresponding to a doneness level specified in a custom food order, and the controller can implement closed-loop feedback techniques to control the position of the piston within the cylinder—via the actuator system—during a grind cycle to achieve this target density. The controller can thus: set a target amount of resistance to displacement of the piston by dispensed ground meat (e.g., in the form of a torque output of the primary actuator or power supplied to the primary actuator) during a grind cycle based on a target density of the hamburger patty.

Throughout the grind cycle, ground meat dispensed into the cylinder can drive the piston downward, as described above, and the controller can track an offset distance from the rim of the cylinder to the face of the piston, such as based on the position of the primary actuator. The controller can then multiply this offset distance by a known cross-sectional area of the cylinder and a predicted density of the ground meat at the current pressure within the cylinder (such as stored in a lookup table) to predict a total mass of ground meat in the cylinder. The controller can then conclude the grind cycle and initiate a weigh cycle once the calculated total mass of ground meat in the cylinder equals, exceeds, or falls within a threshold range of the target size (e.g., target mass) of the hamburger patty.

During the weigh cycle, the controller can: calculate a swept volume of the piston based on a known cross-sectional area of the cylinder and the final position of the piston in the cylinder upon conclusion of the grind cycle; and calculate an actual density of the quantity of ground meat based on the actual mass (or weight) of ground meat in the cylinder and the swept volume of the cylinder; calculate an adjusted target motor current draw or adjusted target motor output torque to achieve the target density of ground meat in the cylinder based on the difference between actual and target densities for the ground meat; and update a lookup table or parametric model linking motor current draw or motor output torque to density of ground meat loaded into the cylinder. If the actual density of the quantity of ground meat is less than a threshold density but the total mass (or weight) of ground meat in the cylinder is greater than a threshold quantity, the controller can return the cylinder to the grind position, advance the shear assembly, and trigger the primary actuator to rack the piston to the adjusted target motor current draw or to the adjusted target motor output torque in order to compress the quantity of meat between the piston and the shear plate, as described below. However, if the total mass (or weight) of the quantity of meat is less than the threshold quantity, the controller can trigger the secondary actuator to return the cylinder to the grind position and can actuate the grinder until an adjusted target load position—described above—is achieved at the adjusted target motor current draw or motor output torque. The controller can repeat this process until at least the target quantity of ground meat is determined to have been dispensed—within a threshold density range—into the cylinder before executing a dispense cycle. Otherwise, if the result of the weigh cycle indicates that more than the target quantity of ground meat was dispensed into the cylinder at a density greater than a threshold density, the controller can initiate a dispense cycle.

13.3 Time as Control

In another implementation, upon receipt of a request for a hamburger patty in Block S110, the controller calculates a load position for the piston based on a known cross-sectional area of the cylinder, a last measured density (or an average density, a preset predicted density) of ground meat output by the grinder, and a size of the hamburger patty specified in the request, as shown in FIG. 11. The controller can also estimate a grind duration based on the size (e.g., a target mass) of the hamburger patty and a last measured mass flow rate (or an average mass flow rate, a preset predicted mass flow rate) of ground meat from the grinder. In this implementation, the actuator system returns the cylinder to the grind position and retracts the piston back to the target load position in preparation to grind and press the next hamburger patty, and the controller then actuates the grinder for the grind duration to fill the cylinder with a quantity of ground meat. For example, the controller can also initiate a timer for the grind duration once the grinder is actuated, cease actuation of the timer once the timer expires, trigger the shear assembly to separate contents of the cylinder from the output of the grinder (as described below), actuate the secondary actuator to move the cylinder out of the grind position and into the weigh position, and sample the controller 160 to confirm that at least a minimum weight of ground meat was dispensed into the cylinder.

In this implementation, if less than the minimum weight of ground meat is measured in the cylinder, the controller can: calculate an actual mass flow rate of ground meat during the preceding grind cycle; calculate a secondary grind duration based on the actual mass flow rate of ground meat from the grinder and a difference between the actual and threshold quantity of ground meat; trigger the secondary actuator to return the cylinder to the grind position; and actuate the grinder for the secondary grind duration. The controller can then repeat this process until at least the threshold quantity of ground meat in the cylinder is measured.

In one example of the foregoing implementation, the controller receives a request for a patty of a mass of at least 100 grams. However, if the actual mass of contents in the cylinder after an initial grind duration of 5.0 seconds yields only 95 grams of meat in the cylinder, the controller can update a grind duration to grind 100 grams of ground meat from 5.0 seconds to 5.3 seconds, return the cylinder to the grind position, and actuate the grinder for a secondary grind duration of 0.3 seconds (i.e., the difference between the original and the updated grind durations). The controller can thus predict a new mass of 100.7 grams of ground meat in the cylinder upon conclusion of the secondary grind duration and can sample the controller 160 during a succeeding weigh cycle to confirm this prediction. If greater than 100 grams of ground meat are thus detected in the cylinder, the controller can initiate a dispense cycle to release the quantity of ground meat for cooking. Otherwise, the controller can repeat the forgoing process until the minimum mass (or weight) of ground meat is loaded into the cylinder, as shown in FIG. 11.

As described above, the controller can feed mass flow rate data collected over the course of one or more grind cycles forward to calculate a grind duration for a next hamburger patty in order to maintain a relatively high degree of accuracy in the initial mass (or weight) of ground meat dispensed into the cylinder, such as to compensate for different densities and compositions of whole portions of meat loaded into the hopper over time.

Furthermore, in this and the preceding implementations, if an output of the controller 160 indicates that significantly greater than the target mass of ground meat has been dispensed into the cylinder, the arm can return the cylinder to the grind position, and the controller can trigger the actuator system to drive the piston back toward the unload position (with the shear plate in the retracted position), thereby returning a portion of the contents of the cylinder back into the grinder. The controller can then trigger the shear assembly to move into the advanced position, thereby severing the contents of the cylinder from the grinder, and the controller can implement methods described above to again test the mass (or weight) of ground meat in the cylinder. For example, the controller can: determine a weight of a first quantity of ground meat based on an output of the controller 160 upon conclusion of a first grind cycle; trigger the actuation system to execute a first dispense cycle in response to the weight of the first quantity of ground meat exceeding a minimum weight threshold; calculate a second grind duration based on a difference between the target weight of the hamburger patty and the weight of the first quantity of ground meat and trigger the grinder to dispense additional ground meat into the cylinder for the second grind duration if actual weight of the first quantity of ground meat is less than the minimum weight threshold for the hamburger patty, as shown in FIG. 11; and estimate a third grind duration to form a second hamburger patty in a subsequent grind cycle based on a sum of the first grind duration and the second grind duration.

13.4 Grind Cycle: Cylinder Load as Control

In another implementation, the system 100 determines an amount and density of ground meat dispensed into the cylinder during a grind cycle based on deflection of the cylinder away from the grinder, as shown in FIG. 10. Generally, in this implementation: the controller can calculate a load position for the piston based on a target size and/or density of a hamburger patty; the arm includes a beam supporting the cylinder on a cantilevered end of the beam just below the outlet of the grinder in the grind position; the controller 160 can output a signal corresponding to deflection of the beam from an unloaded position; the primary actuator constrains the piston in load position during a corresponding grind cycle; the grinder grinds meat into the cylinder, wherein proximity of the top of cylinder to the outlet of the grinder limits discharge of ground meat over the rim of the cylinder and enables pressure within the cylinder to rise during the grind cycle; and the grinder can cease dispensation of ground meat into the cylinder in response to an output of the controller 160 exceeding a threshold value correlated with predicted deflection of the beam at complete loading of the cylinder for a given quantity and/or density of ground meat in the cylinder.

The controller can thus calculate a target load on the arm (or deflection distance of the arm) for the cylinder to achieve the preset or target density for the hamburger patty. In particular, as the grinder fills the cylinder with ground meat during a grind cycle, ground meat accumulating in the cylinder forces the cylinder away from the outlet of the grinder, and the controller 160 outputs a signal corresponding to such load on (or deflection of) the cylinder relative to the outlet of the grinder. For example, the controller can pass a target density for the hamburger patty and the offset distance of the piston below the rim of the cylinder (i.e., the "load position") into a parametric model specific to a type of meat loaded into the hopper in order to calculate a target load on (or target deflection distance for) the cylinder to trigger conclusion of a grind cycle.

During the grind cycle, the controller can thus sample the controller 160 to track such load on (or deflection of) the cylinder (or load, etc. on the cylinder) and can conclude the grind cycle once the measured deflection of the cylinder (or load on the cylinder) exceeds the target deflection distance. Upon conclusion of the grind cycle, the controller can execute a weigh cycle, as described above. In particular, if the weight of ground meat in the cylinder is less than the target weight of ground meat specified in a corresponding food order, the controller can calculate an adjusted (i.e., greater) offset distance between the piston and the rim of the cylinder, shift the piston to this adjusted offset distance, return the cylinder to the grind position, and actuate the grinder until the output of the controller 160 indicates that the target load on (or deflection of) the cylinder has been achieved before repeating the weigh cycle. During a weigh cycle, the controller can also calculate an actual density of the quantity of ground meat in the cylinder, as described above, and update a target load on (or target deflection of) the cylinder to achieve the target density—such as in a lookup table or in a parametric model—commensurate with a difference between the predicted density and the actual density of the quantity of ground meat dispensed into the cylinder, and the system 100 can implement this adjusted target load (or target deflection distance) when adding additional ground meat to the cylinder in a second grind cycle.

However, if the measured quantity of ground meat in the cylinder meets or exceeds the target quantity, the system 100 can follow the weigh cycle with a dispense cycle. The system 100 can also implement methods and techniques described above to revise the offset distance between the piston and the rim of the cylinder and/or to revise the target load on (or deflection of) the cylinder—such as in a lookup table or in a parametric model—in order to achieve greater precision in the quantity and density of ground meat dispensed into the cylinder during a next grind cycle for a next hamburger patty, as shown in FIG. 10.

As described above, the controller can sample the controller 160 while the cylinder is in the grind position to determine a load on (or deflection of) the cylinder during a grind cycle, and the controller can sample the same controller 160 (or a second controller 160) while the cylinder is in the weigh position to determine a weight or mass of ground meat in the cylinder during a weigh cycle. For example, in this implementation, the method S100 can further include Block S160, which recites, in response to the second threshold load corresponding to the target size of the meat patty exceeding the second load on the cylinder in the weigh position: calculating an adjusted first threshold load on the cylinder in the grind position based on a difference between the second load and the second threshold; returning the cylinder to the grind position; dispensing additional ground meat from the grinder into the cylinder; and storing the adjusted first threshold load for implementation in a subsequent grind cycle for a subsequent meat patty. In this example, in response to a third load on the cylinder in the grind position exceeding the adjusted first threshold load, the system 100 can shift the cylinder to the weigh position in Block S130 and then execute the dispense cycle in Blocks S140, S142, and S144 in response to a fourth load on the cylinder in the weigh position exceeding the second threshold load.

14. Patty Compression

In one variation, upon conclusion of a grind cycle and before initiation of a weight cycle or a dispense cycle, the primary actuator can drive the piston toward the shear plate to compress the quantity of ground meat currently in the cylinder between the piston and the shear plate in order to form a hamburger patty. For example, upon conclusion of a grind cycle, the controller can trigger the shear assembly to advance the shear plate and then trigger the primary actuator to drive the piston upward by a target distance in order to achieve a patty compaction level corresponding to a doneness level specified for the hamburger patty in a food order.

The system 100 can implement similar methods and techniques to compact a quantity of ground meat following confirmation that at least the target amount of ground meat has been loaded into the cylinder in Block S130. In particular, in the foregoing implementations, once the target mass (or weight) of ground meat is confirmed in the cylinder, the controller can trigger the actuator system to compress the ground meat into a tighter-packed patty by closing the open end of the cylinder with the shear plate (or other feature or element within the system 100) and then driving the piston back toward the top of the cylinder. In one example, once the minimum amount of ground meat is dispensed into the cylinder: the secondary actuator can return the cylinder to the grind position; the controller can set the shear plate in the advanced position between the output of the grinder and the open end of the cylinder; and the primary actuator can apply a torque to the second shaft to drive the piston upward, thereby compressing the ground meat between the piston and the shear plate. In this example, the controller can monitor power draw of the primary actuator and/or the torque output of the primary actuator and can trigger the primary actuator to drive the piston upward until a target torque output of the primary actuator—corresponding to a target patty compression—is detected. Similarly, the controller can sample a position sensor 164 within the actuator system and can actuate the primary actuator to drive the piston upward by a target distance (e.g., 2.0 millimeters) or by a target percentage of the distance between the top of the cylinder and the face of the piston in the final load position (e.g., 15%) to achieve a target compression of the ground meat into a hamburger patty. The system 100 can thus control the density and/or compaction of a quantity of ground meat in the cylinder during a grind cycle or upon conclusion of a grind cycle.

15. Dispense Cycle

Upon confirmation that a sufficient amount of ground meat has been loaded into the cylinder, the system 100 can execute a dispense cycle. Generally, during a dispense cycle, the system 100 can: invert the cylinder in Block S140; and drive the piston toward the top of the cylinder in Block 142.

In one implementation, the housing 190 includes: an opening between the grind position adjacent the grinder and a dispense position over a cooking surface (or other surface configured to receive a raw hamburger patty from the cylinder); a door 192 configured to close the opening; and a door actuator configured to selectively open and close the doors. In this implementation, the controller can: trigger the door actuator to open the door; then trigger the secondary actuator to rotate the arm, thereby positioning the cylinder outside of the housing and into the dispense position; and finally trigger the primary actuator to invert the cylinder in Block S140 and to drive the piston into the unload position in Block S142, thereby discharging the quantity of ground meat from the cylinder. In this implementation, the door can be split, as shown in FIG. 10; after opening both sides of the door and advancing the cylinder out of the housing, the door actuator can return a first side of the door to a closed position during the dispense cycle in order to preserve a cool environment within the housing. To return the cylinder to the grind position in preparation to form a next hamburger patty, the system 100 can open the first side of the door, retract the cylinder back into the housing, and then return both sides of the door to their closed positions. Furthermore, in this implementation, the sides of the doors can mate along adjacent inclined surfaces, and the door actuator can drive an upper side of the door downward onto the lower side of the door to seal the mating surfaces of the sides of the door and to seat the perimeter of the door in a receiver around the opening in the housing in order to limit air exchange between the interior of the housing and an external environment throughout operation of the system 100.

However, the housing can include doors that are hinged and sprung closed or actively or passively opened and closed in any other suitable way, and the system 100 can open and close the door(s) in any other sequence during a dispense cycle to limit air exchange between the interior of the housing and an external environment.

In one variation, the method S100 further includes Block S150, which recites, following the dispense cycle, recording a third load on the cylinder in the weigh position and confirming dispensation of the quantity of ground meat from the cylinder based on the second load exceeding the third load. Generally, in this variation, the system 100 can execute a post-dispense weigh cycle like a weigh cycle described above to confirm that all (or at least most) of the quantity of ground meat previously loaded in the cylinder was dispensed during the preceding dispense cycle. For example, the controller can store a baseline load on the cylinder or on the arm (e.g., in the form of a baseline output value of the controller 160) corresponding to an empty cylinder, and the controller can check that the load on the cylinder or on the arm has returned to this baseline load (or to within a threshold range of this baseline) following a dispense cycle. In this example, if a result of the post-dispense weigh cycle indicates that none (or less than 10%) of the quantity of ground meat was released from the cylinder during the dispense cycle, the system 100 can repeat the dispense cycle to attempt another release. However, if the result of the post-dispense weigh cycle indicates that between 10% and 90% of the quantity of ground meat remains in the cycle, the system 100 can discard the remainder of the ground meat in the cylinder, such as by repeating the dispense cycle, and then issuing an alarm to the automated foodstuff assembly apparatus to discard the hamburger patty due to possible fragmentation during the initial dispense cycle.

However, the system 100 can handle dispensation of a quantity of ground meat from the cylinder in any other suitable way in Blocks S140, S140, and S150.

16. Gas Supply

Figure 8:
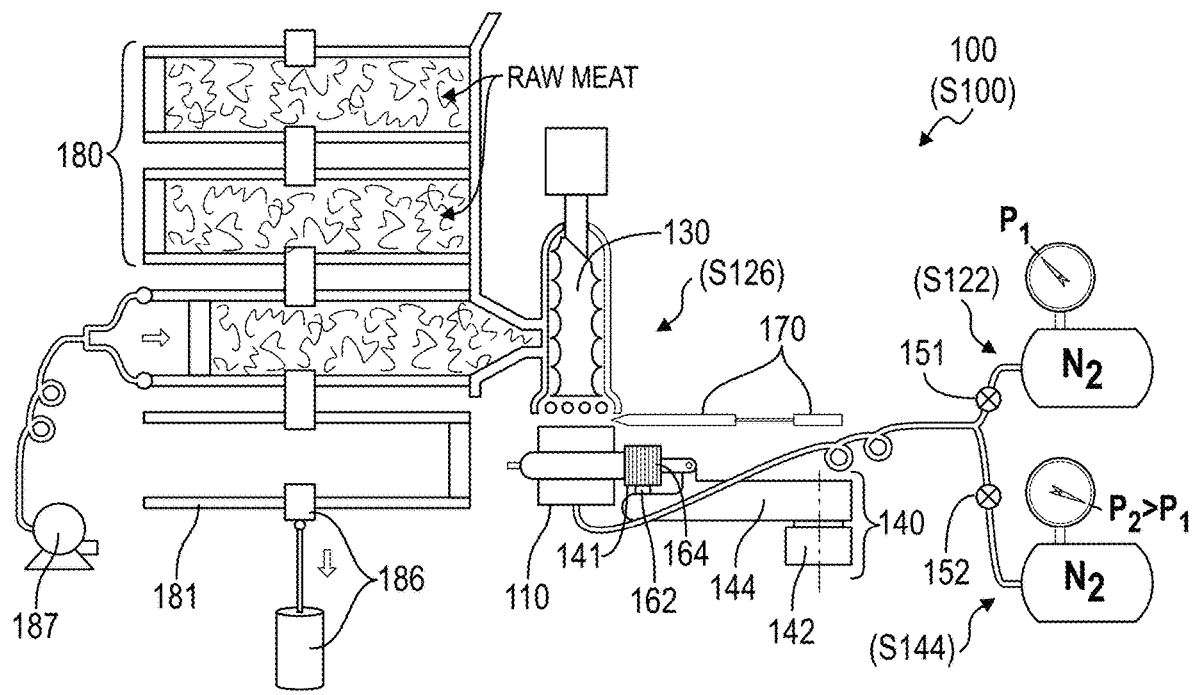
FIG. 8 is a schematic representation of one variation of the system.

One variation of the system 100 further includes a gas supply 150: configured to supply gas to the cylinder behind the piston at a first pressure during the grind cycle to limit ingress of ground meat into the gas ports 122, as shown in FIG. 8; and configured to supply gas to the cylinder behind the piston at a second pressure greater than the first pressure during the dispense cycle to dislodge the quantity of ground meat from the piston, as shown in FIGS. 10 and 11. Generally, the gas supply 150 functions to supply gas (e.g., air, humidified air, nitrogen, or another inert gas, etc.) to a chamber in the cylinder behind the piston and through ports in the face of the piston at a relatively high flow rate (or at a relatively high pressure) during a dispense cycle in order to separate the quantity of ground meat from the face of the piston, thereby aiding release of the quantity of ground meat from the cylinder during the dispense cycle. Furthermore, to prevent meat or related moisture from entering the ports and soiling the chamber behind the piston, the gas supply 150 can also displace gas into the chamber behind the piston at a relatively low flow rate (or at a relatively low pressure) throughout other periods of operation (e.g., grind cycles, weigh cycles).

The gas supply 150 can thus execute Block S122 of the method S100, which recites displacing gas into a chamber in the cylinder behind the piston at a first pressure during a grind cycle, and Block S124, which recites displacing gas into the chamber at a second pressure greater than the first pressure to dispense the quantity of ground meat, in the form of a patty, from the cylinder during a dispense cycle.

In one implementation, the gas supply 150 includes a reservoir containing pressurized gas, a first valve 151 fluidly coupled to the reservoir and to the cylinder, a first pressure regulator set to a first pressure and interposed between the reservoir and the first valve 151, a second valve 152 fluidly coupled to the reservoir and to the cylinder, and a second pressure regulator set to a second pressure greater than the first pressure and interposed between the reservoir and the second valve 152, as shown in FIGS. 8 and 10. The gas supply 150 can also include a conduit extending from the valve(s) to a flexible line tapped into the cylinder behind the piston; the flexible line can deform as the cylinder is inverted and righted throughout operation, and the conduit and flexible line can cooperate to communicate pressurized gas from the valve(s) to the cylinder. Alternatively, the second shaft—passing into the cylinder and coupled to the piston via a crank and connecting rod—can be hollow and can include a port that communicates gas from the hollow center of the second shaft to the chamber behind the piston; the conduit can thus be substantially rigid and can be coupled to the second shaft via a rotatable seal to communicate pressurized gas from the valve(s) into the cylinder. However, the gas supply 150 can be fluidly coupled to the cylinder in any other way.

In the foregoing implementation, the controller can selectively open the first valve 151 for a first duration of time during the grind cycle (e.g., for the entirety of the grind cycle and subsequent weigh cycle) in order to limit ingress of meat and fluids past the piston; and the controller can selectively open the second valve 152 for a second duration of time less than the first duration of time during the dispense cycle (e.g., for a burst of one second) in order to dislodge the quantity of meat from the cylinder.

Alternatively, the gas supply 150 can include a pump, and the controller can selectively activate the pump to pump gas (e.g., air) into the cylinder at different pressures or at different flow rates based on the current state of the system 100, such as whether the system 100 is currently in a grind cycle or in a dispense cycle. However, the gas supply 150 can include any other one or more reservoirs, valves, and/or pumps configured to supply gas to the cylinder at two or more flow rates or pressures throughout operation of the system 100.

17. Mixed-Meat Patty

In one variation, the system 100 is configured to form a hamburger patty from multiple types of meat. In this variation, the system 100 includes a set of grinder modules arranged within the housing, wherein each grinder module includes a hopper and a grinder and is configured to grind and dispense a unique type of meat (e.g., beef, lamb, chicken, or turkey, etc.) or a unique meat blend (e.g., 80% beef and 20% turkey, 50% lamb and 50% bison).

In one implementation, the system 100 includes a magazine 186 supporting each of the grinder modules and configured to selectively position each grinder module in the grind position over the cylinder based on a callout for a particular meat type or combination of meat types in a food order received in Block S110. Generally, in this implementation, the controller can trigger the magazine 186 to selectively reposition a particular grinder module into the grind position and can selectively actuate its grinder to dispense a volume of ground meat of the corresponding meat type from the particular grinder module into the cylinder. For example, the housing can include a first grinder module loaded with whole portions of beef, a second grinder module loaded with whole portions of lamb, and a third grinder module loaded with whole portions of turkey. In this example, upon receipt of an order for a hamburger with a 30%-beef and 70%-turkey hamburger patty, the controller can: index the first grinder module into the grind position; actuate the first grinder actuator for a first calculated grind duration (described above) sufficient to achieve 30% of the target weight of the hamburger patty in beef or until the piston is displaced—by ground beef—by 30% of the distance toward the final calculated load position for the target size of the hamburger patty during a first grind cycle; execute a first weigh cycle to confirm the amount of beef loaded into the cylinder, as described above; and trigger the magazine 186 to index the third grinder module into the grind position. The system 100 can then actuate the third grinder for a second calculated grind duration sufficient to achieve 70% of the target weight of the hamburger patty in turkey or until the piston is displaced—by ground turkey—to the final calculated load position for the target size of the hamburger patty during a second grind cycle; execute a second weigh cycle to confirm the amount of turkey loaded into the cylinder; and then execute a dispense cycle to release the mixed-meat hamburger patty onto an adjacent cooking surface. Thus, in this implementation, the system 100 can create a single hamburger patty with multiple layers of distinct types of meat.

In the foregoing implementation, the system 100 can layer distinct types of meat in the patty based on preferred cooking temperatures for the distinct types of meats supported in the housing and can interface with an external cooking surface to cook distinct meat types in one patty at corresponding preferred temperatures. For the example above in which the system 100 forms a hamburger patty with a 30%-beef lower layer and a 70%-turkey upper layer, the system 100 can invert and dispense the hamburger patty beef-side up into a double-sided griddle; the automated foodstuff assembly apparatus can then bring an upper cooking surface of the double-sided griddle into contact with the beef-side of the patty and heat the upper cooking surface to a preferred temperature for cooking beef (e.g., 450° F.). The automated foodstuff assembly apparatus can also bring a lower cooking surface of the double-sided griddle—in contact with the turkey-side of the patty—to a preferred temperature for cooking turkey (e.g., 410° F.).

Alternatively, in this variation, the system 100 can include a mixer configured to mix contents of the cylinder once a particular ratio of various meat types is dispensed into the cylinder. For example, once a specified amount of two or more distinct meat types is dispensed from two or more grinder modules into the cylinder, the arm can advance the cylinder to a mix position adjacent the mixer (e.g., between the grind position and the dispense position), and the mixer can mix the contents of the cylinder, such as for a preset period of time or until a threshold uniformity is reached. The actuation system can then return the cylinder to the grind position, the shear assembly can advance the shear plate over the cylinder, and the actuator system can rack the piston (i.e., drive the piston upward) to compress the patty, as described above, prior to dispensing the mixed-meat patty onto a cooking surface.

In this variation each grinder module can include discrete actuators configured to drive its upper and lower augers and to actuate its grinder. Alternatively, the system 100 can include a single set of auger and grinder actuators configured to engage corresponding input shafts of a hopper and a grinder of a particular grinder module when the magazine 186 positions the particular grinder module in the grind position.

In a similar implementation, the system 100 can include a set of static grinder modules, and the arm can selectively transition the cylinder to dispense positions at each grinder module to collect a target amount of ground meat from each grinder module, such as based on a specification for hamburger patty composition included in a custom food order received from a patron in Block S110. The controller can thus trigger the secondary actuator to sequentially position the cylinder into select dispense positions adjacent each grinder module based on meat types loaded into each grinder module and based on an order for a hamburger patty specifying particular amounts (e.g., percentages, masses, volumes) of such meat types.

18. Multiple Hoppers

In one variation shown in FIG. 8, the system 100 includes: a set of hoppers 180, wherein each hopper in the set of hoppers 180 is configured to store whole portions of meat, defines an outlet configured to couple to an inlet of the grinder, and includes a hopper piston opposite the outlet; a magazine 186 configured to support each hopper in the set of hoppers 180 and to selectively position each hopper, in the set of hoppers 180, in a discharge position to supply whole portions of meat to the grinder; and a hopper actuator configured to drive a hopper piston of a hopper in the discharge position toward the grinder to feed whole portions of meat into the grinder.

Generally, in this variation, the system 100 includes multiple hoppers configured to individually feed whole portions of meat into a single grinder. In particular, each hopper can be loaded with a quantity of unground meat and then loaded into the magazine 186; when a first hopper in the set is fully emptied of meat, the magazine 186 can index the magazine 186 forward to replace the now-empty first hopper with a full second hopper in order, as shown in FIG. 8, to enable the system 100 to continue to form hamburger patties (e.g., according to the method S100) without pause.

Figure 9:
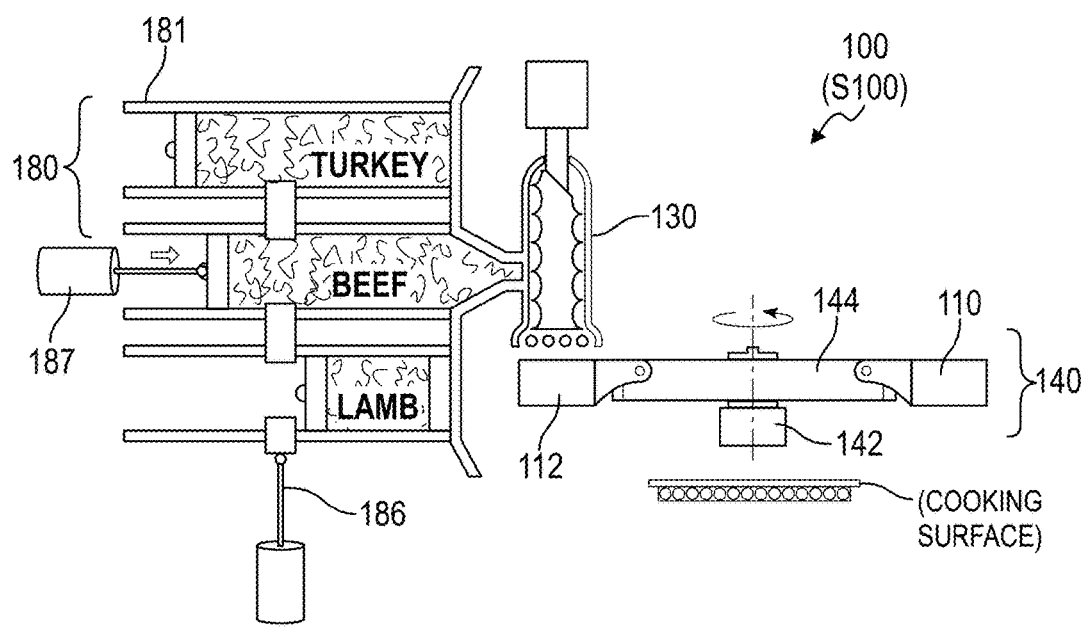
FIG. 9 is a schematic representation of one variation of the system.

In one implementation, each hopper includes a tube, such as a tube or cylinder cross-section defining an outlet; and a piston arranged within the tube opposite the outlet. In this implementation, the hopper can be loaded with whole portions of raw meat between the piston and the outlet and then installed in the magazine 186 inside the housing along with other like hoppers. In this implementation, the hopper actuator can include a linear actuator; thus, when the magazine 186 positions a particular hopper in the set in a discharge position, the outlet of the particular hopper can be aligned with and sealed over an inlet of the grinder, and the linear actuator can engage the piston opposite the whole portions of raw meat and can drive the piston toward the outlet of the particular hopper in order to drive whole portions of raw meat into the grinder, as shown in FIG. 9. Alternatively, the hopper actuator can include a pressure chamber configured to seal over the rear of the particular hopper in the discharge position and that is configured to pressurize a volume behind the piston in order to drive the piston toward the inlet of the grinder, as shown in FIG. 8. In this implementation, once the piston in the particular hopper in the discharge position is fully advanced to the outlet of the particular hopper such that few or no whole portions of raw meat remain in the hopper, the controller can trigger the magazine 186 to index the particular hopper to a discard position and to (simultaneously) advance a second hopper—currently filled with whole portions of raw meat—into the discrete position. The hopper actuator can then similarly advance the piston of the second hopper forward, as described above. The system 100 can repeat this process over time as the hoppers in the magazine 186 are emptied.

Alternatively, in this variation, hoppers installed in the magazine 186 can be loaded with different types of meat, and the magazine 186 can selectively position a hopper in the discharge position based on a type of meat loaded into the hopper and a type of meat specified for a hamburger patty currently in process, as shown in FIG. 9. In this variation, because remnants of a first type of meat may remain in the grinder after a first hopper in the discharge position is replaced with a second hopper containing a second type of meat, the system 100 can further include an intermediate container 112 configured to collect ground meat remnants from the grinder between a hopper exchange cycle in which the magazine 186 exchanges one hopper containing one type of meat for another hopper containing another type of meat during an exchange cycle. For example, the intermediate container 112 can define a cup of sufficient internal volume substantially equivalent to an internal open volume of the grinder such that the intermediate container 112 can hold substantially all ground meat discharged from the grinder during an exchange cycle. The intermediate container 112 can be supported on a second arm configured to selectively position the intermediate container 112 under the outlet of the grinder to receive ground meat from the grinder during an exchange cycle and configured to retract the intermediate container 112 from the grinder to permit the actuation system to move the cylinder into the grind position. The second arm can be actuated by a second actuation system, and the second actuation system can also be configured to elevate the intermediate container 112 over the cylinder and to invert the intermediate container 112 to dispense contents of the intermediate container 112 into the cylinder, such as in response to receipt of a request for a hamburger patty containing a meat type previously dispensed into the intermediate container 112 during a former exchange cycle. The intermediate container 112 and the second actuator system can thus define a structure substantially similar to the cylinder and the actuation system and can cooperate with the cylinder and the actuation system to recycle ground meat of a first type—previously discharged from the grinder during a discharge cycle in preparation to grind another meat type dispensed from another hopper—by returning this ground meat to the cylinder to form a hamburger patty of the first meat type. Alternatively, as shown in FIG. 9, the system 100 can include an intermediate container 112 defining a second cylinder and a second piston and including a second actuator system like the cylinder, the piston, and the actuator system described above, and the system 100 can selectively position the cylinder and the second cylinder in the grind position to form hamburger patties and to store ground meat discharged from the grinder during an exchange cycle based on meat types specified in a food order received in Block S110.

In one example: the set of hoppers 180 includes a first hopper containing whole portions of meat of a first type and a second hopper containing whole portions of meat of a second type distinct from the first type; and, in response to receipt of a food order specifying meat of the second type when the first hopper is in the discharge position, the grinder grinds remnants of meat of the first type contained in the grinder into the intermediate canister, the magazine 186 exchanges the first hopper for the second hopper, the hopper actuator drives the hopper piston of the second hopper toward the outlet of the second hopper, the grinder grinds whole portions of meat of the second type into the cylinder, and the system 100 implements methods and techniques described above to form, weigh, and dispense the quantity of meat of the second type.

The system 100 can therefore include multiple hoppers containing various types of meat, and the system 100 can trigger the magazine 186 to selectively position these hoppers in the discharge position to serve whole portions of ground meat to the grinder based on a food order specifying a hamburger patty of one or more meat types. However, the system 100 can include any other number and/or form of hoppers, grinders, cylinders, intermediate canisters, and/or actuator systems to enable the system 100 to form hamburger patties containing various types of meat.

19. Cylinder Variations

In one variation, the system 100 excludes the piston, and the cylinder defines a frustoconical internal volume that is tapered vertically downward in the upright position. In this variation, the actuator system can further include a vibrator assembly (e.g., a rotary motor and a rotating eccentric mass) that is actuated as the actuator system inverts the cylinder to dispense a patty contained therein onto an adjacent cooking surface, thereby oscillating the patty at a relatively high frequency and low amplitude to release the patty from the cylinder. In this variation, the actuator system can also jostle the cylinder at a relatively low frequency and at a relatively high amplitude once the cylinder is inverted to further coax the patty out of the cylinder during a dispense cycle.

In a similar variation, the system 100 excludes the piston and the actuator system, and the cylinder defines a frustoconical internal volume that is tapered vertically upward. In this variation, the system 100 includes a vibrator assembly coupled to the arm, and the controller activates the vibrator assembly when the cylinder is in the dispense position to coax a patty contained therein out of the cylinder and onto an adjacent cooking surface during a dispense cycle.

In another variation, the cylinder includes split halves, and the cylinder actuator system selectively opens the halves of the cylinder to release a patty contained therein onto an adjacent cooking surface.

However, the cylinder can define any other suitable geometry, and the patty grinding system can include any other actuator or subsystem to dislodge a patty from the cylinder and to release the patty onto an adjacent cooking surface.

20. Alternative Arm Assembly

With reference to FIGS. 12-21, an arm assembly 210 is provided that can replace the arm 144 and cylinder 110 in the system 100. The arm assembly 210 may include an actuator 212, a first arm portion 214 pivotably connected to the actuator 212, a second arm portion 216 pivotably connected to the first arm portion 214, and a cylinder 218 rotatably connected to the second arm portion 216. The arm assembly 210 is movable between a first position (FIG. 12) in which the cylinder 218 receives a patty 202 (e.g., a food product such as hamburger or other ground meat, ground vegetarian food product, etc.) from a food dispenser (e.g., the grinder 130) and a second position (FIG. 13) in which the patty is ejected from the cylinder 218 onto a cooking surface 204 (e.g., an induction cooker, an electric resistance-heated surface, a flame-heated frying surface, a flame-grilling surface, etc.).

In some embodiments, an extruding plate (e.g., a plate with a plurality of apertures, as shown in FIG. 2) may be provided on a lower end of the grinder 130 such that the grinder forces food product through the apertures in the extruding plate. The food product falls from the extruding plate into the cylinder 218 and forms a patty therein. In this manner, the extruded food product will form a patty in the cylinder with "grains" of the food product arranged in an orientation that is generally in the same direction in which a patron will bite into the patty. Orienting the food grains in this manner may improve the patron's perception of the tenderness or texture of the patty.

Figure 12:
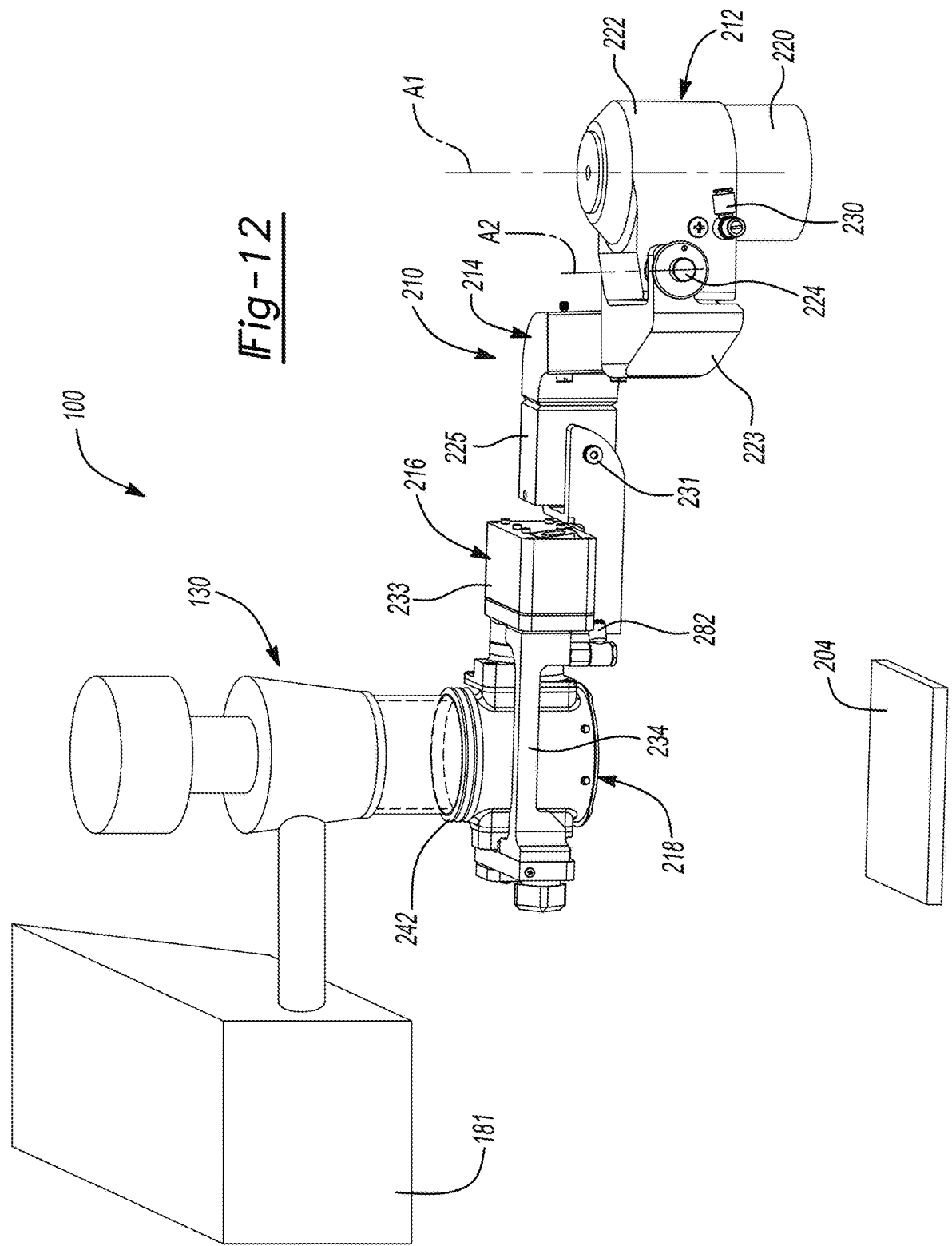
FIG. 12 is a perspective view of a system having an alternative arm assembly in a first position.
Figure 13:
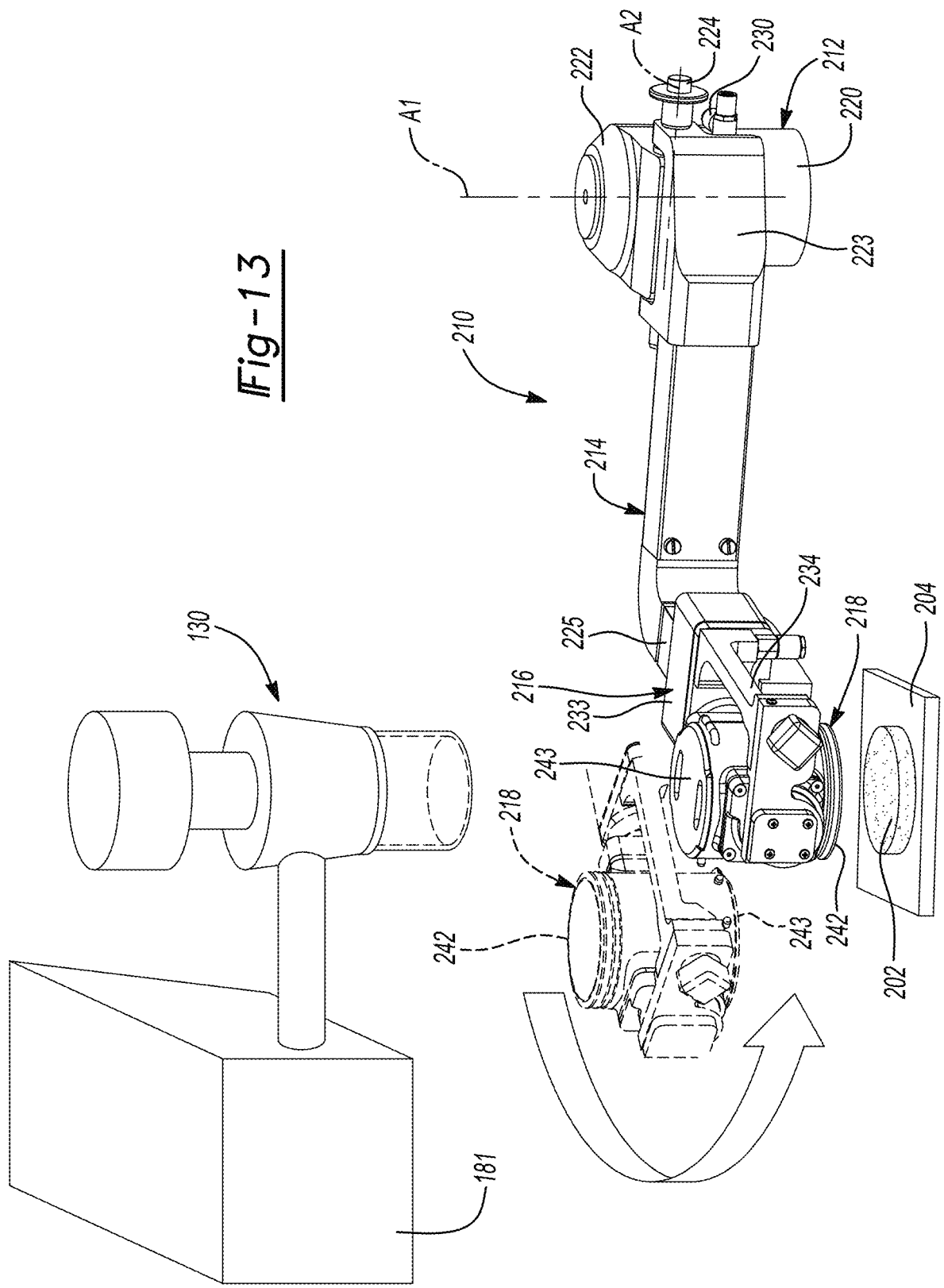
FIG. 13 is a perspective view of the system of FIG. 12 with the arm assembly in a second position.

The actuator 212 may include a motor 220 (shown schematically in FIGS. 12 and 13) and a sleeve body 222. The motor 220 may include an output shaft (not shown) that engages the sleeve body 222 such that rotation of the output shaft causes rotation of the sleeve body 222 (as well as the first and second arm portions 214, 216 and the cylinder 218) about a first rotational axis A1 between the first position (FIG. 12) and the second position (FIG. 13).

The first arm portion 214 may be a generally L-shaped member (in some embodiments, the first arm portion 214 may be a straight beam) having a first end 223 and a second end 225. The first end 223 of the first arm portion 214 may be pivotably coupled to the sleeve body 222 by a pin 224 that extends through the sleeve body 222 and an end of the first arm portion 214. In this manner, the pin 224 defines a second rotational axis A2 (FIGS. 12, 13, 16, and 17) about which the first and second arm portions 214, 216 and the cylinder 218 rotate relative to the sleeve body 222 between an raised position (FIG. 14) and a lowered position (FIG. 15). The second rotational axis A2 may be approximately perpendicular to the first rotational axis A1.

Figure 14:
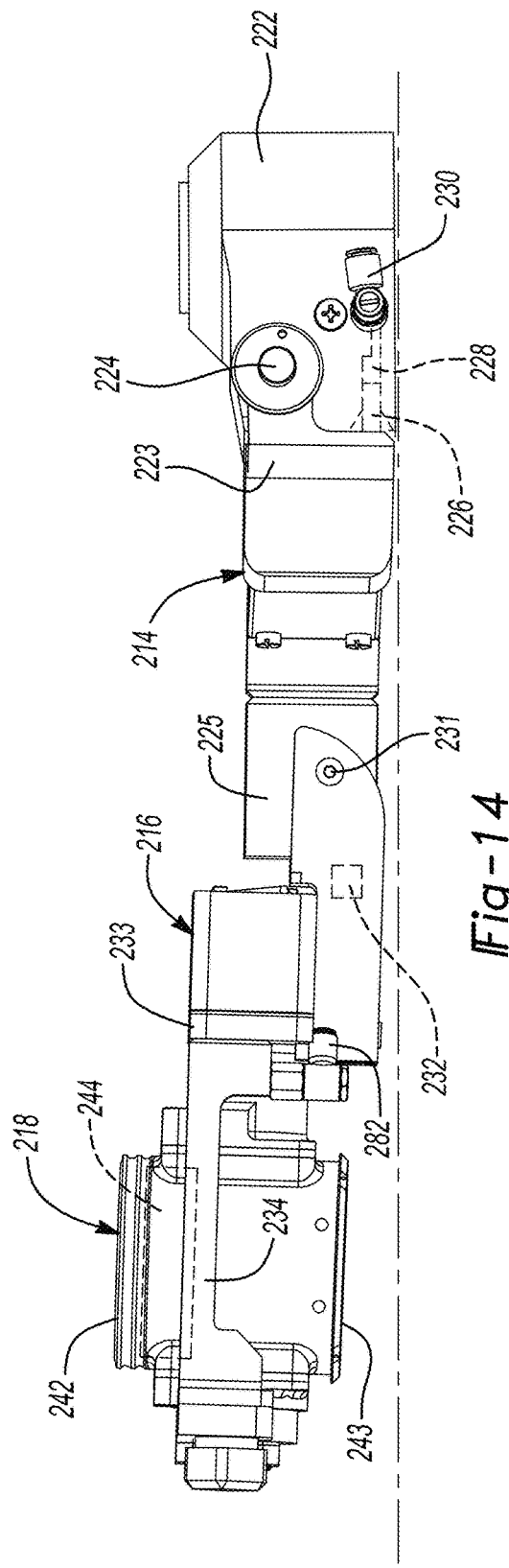
FIG. 14 is a side view of the arm assembly in a raised position.
Figure 15:
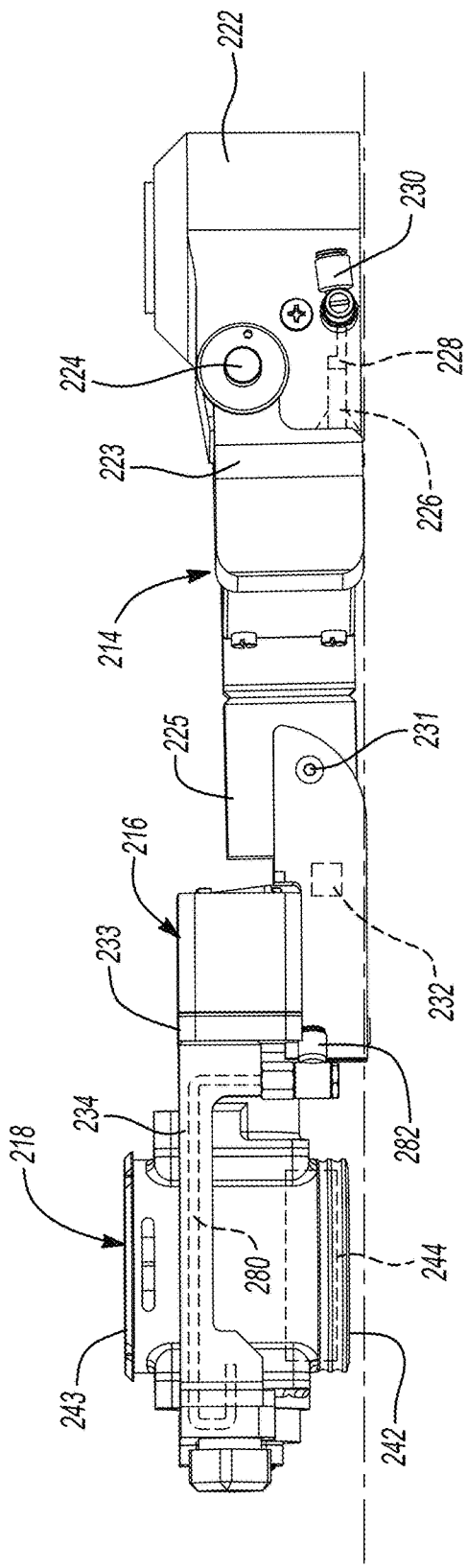
FIG. 15 is a side view of the arm assembly in a lowered position.

As shown in FIGS. 14 and 15, one or more plungers or pistons 226 may be movably received within cylindrical bores 228 formed in the sleeve body 222. Gas ports 230 may be attached to the sleeve body 222 and may be in fluid communication with the bores 228. A source of compressed gas (e.g., compressed air, nitrogen, carbon dioxide, etc.) (not shown) may be connected to the gas ports 230. One or more valves and/or pumps (not shown) may control a flow of gas between the source of compressed gas and the bores 228 to cause movement of the plungers 226 within the bores 228. That is, compressed gas may be provided to the bores 228 to force the plungers 226 outward against the first arm portion 214 to pivot the first and second arm portions 214, 216 and the cylinder 218 about the second rotational axis A2 toward the raised position (FIG. 14). Compressed gas may be evacuated or leaked from the bores 228 to allow the plungers 226 to move further into the bores 228 to pivot the first and second arm portions 214, 216 and the cylinder 218 about the second rotational axis A2 toward the lowered position (FIG. 15). In this manner, the first and second arm portions 214, 216 and the cylinder 218 may be rapidly pivoted between the raised and lowered positions to assist in separating a patty from the cylinder 218.

The second arm portion 216 may be pivotably connected to the second end 225 of the first arm portion 214 by a pin or fastener 231 (FIGS. 14 and 15) that extends through the first and second arm portions 214, 216. A load cell 232 (shown schematically in FIGS. 14 and 15) may be attached to surfaces of the second arm portion 216 and the second end 225 of the first arm portion 214. The load cell 232 can be similar or identical to the load cell described above. For example, the load cell 232 can be any suitable type of load cell such as a strain-gauge load cell (e.g., a shear beam load cell), a piezoelectric load cell, or a pneumatic load cell, for example. The weight of the second arm portion 216 and the cylinder 218 applies a force that rotationally biases the second arm portion 216 relative to the first arm portion 214 about a third rotational axis A3 (FIGS. 16 and 17) defined by the pin 231. The load cell 232 may resiliently compress or deform as weight is added to the cylinder 118. The load cell 232 can send a signal to a controller that indicates a magnitude of a load that causes such compression or deformation. In this manner, the controller can determine the weight of any food product (e.g., hamburger, etc.) that is dispensed into the cylinder 218 from the grinder 130. This information can be used to control operation of the grinder 130 to dispense a desired amount of food product into the cylinder 218 when the arm assembly 210 is in the first position (FIG. 12).

The second arm portion 216 may include a first member 233 and a second member 234 that cooperate to form a gimbal that supports the cylinder 218 for rotation relative to the second arm portion 216. As shown in FIG. 18, a first shaft 236 extends between the first member 233 and the cylinder 218. A second shaft 238 extends between the second member 234 and the cylinder 218 at a location 180 degrees apart from the first shaft 236. The first and second shafts 236, 238 cooperate to define a fourth rotational axis A4 about which the cylinder 218 rotates relative to the second arm portion 216 between a load position (FIGS. 14 and 16) and a unload position (FIGS. 15 and 17). In the load position, an open axial end 242 of the cylinder 218 faces vertically upward so that the food product from the grinder 130 can be received into an opening in the open axial end 242 (as shown in FIG. 12). In the unload position, the open axial end 242 of the cylinder 218 faces vertically downward so that the food product (i.e., the patty) inside of the cylinder 218 can be dispensed from the cylinder 218 onto the cooking surface 204 (as shown in solid lines in FIG. 13).

As shown in FIGS. 14 and 15, a piston 244 is movable within the cylinder 218 between a retracted position (FIG. 14) in which the piston 244 is a first distance from the open axial end 242 of the cylinder 218 and an extended position (FIG. 15) in which the piston 244 is a second distance (i.e., a lesser distance than the first distance) from the open axial end 242 of the cylinder 218.

As shown in FIG. 18, a planetary gearbox or gear train 246 (shown schematically) extends between the first member 233 of the second arm portion 216 and the cylinder 218. The planetary gear train 246 is driven by a motor 248 (shown schematically in FIG. 18) and is operable to sequentially rotate the cylinder 218 about the fourth rotational axis A4 between the load position (FIGS. 14 and 16) and the unload position (FIGS. 15 and 17) and move the piston 244 relative to the cylinder 218 between the retracted position (FIG. 14) and the extended position (FIG. 15).

Figure 19:
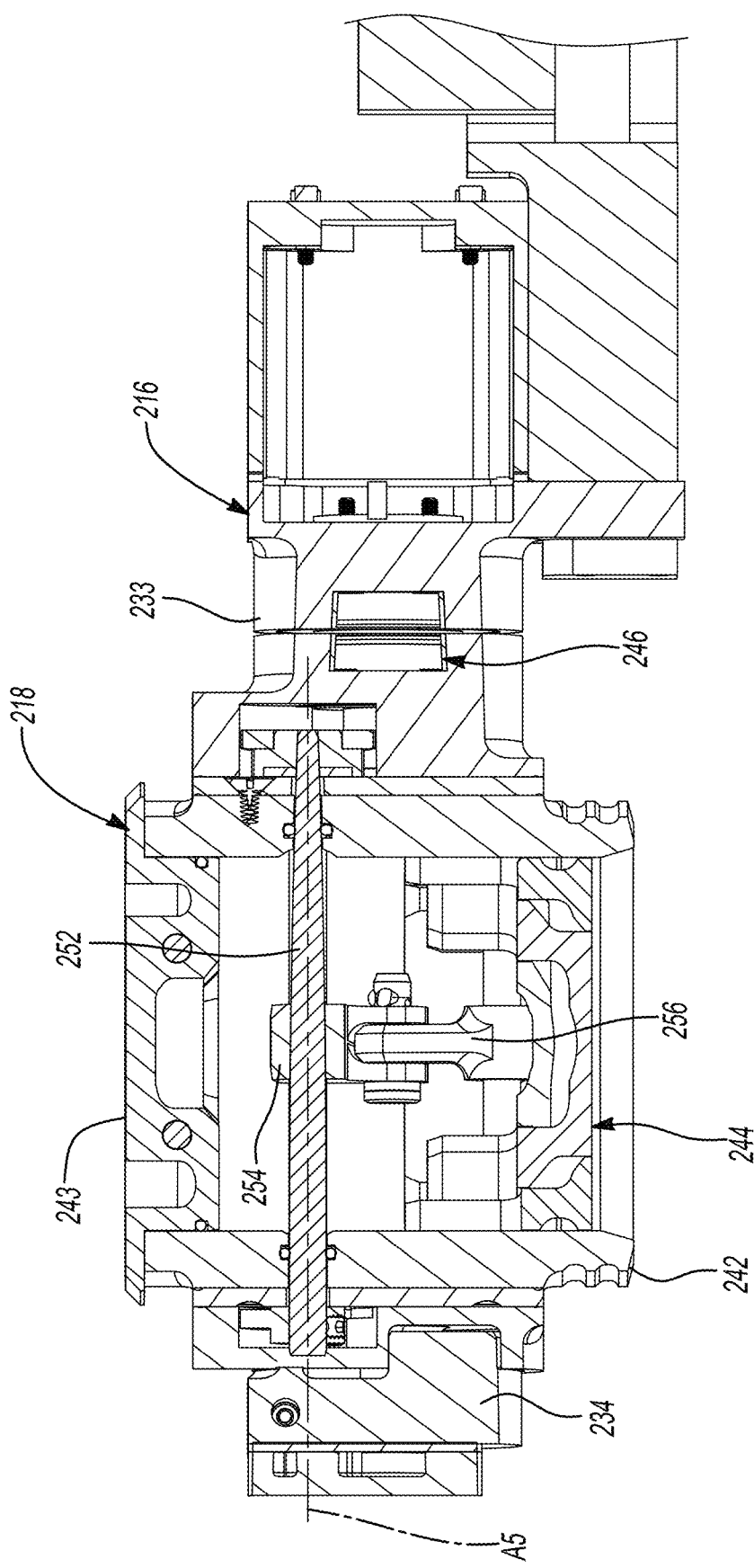
FIG. 19 is another partial cross-sectional view of the arm assembly.

Like the planetary gear train 145 described above, the planetary gear train 246 may include planet gears, a sun gear, and a ring gear. The motor 248 may drive a ring gear. The sun gear may be coupled to the first shaft 236 to drive the drive the cylinder 218 between the load and unload positions. A planet gear may be drivingly coupled to a driveshaft 252 (FIG. 19). The driveshaft 252 defines a fifth rotational axis A5 that is parallel to and offset from the fourth rotational axis A4. The driveshaft 252 is drivingly coupled to the piston 244 via a crank member 254 and a connecting rod 256.

When a patty is disposed within the cylinder 218, friction between the patty and the inner wall of the cylinder 218 may provide some resistance to movement of the piston 244 relative to the cylinder 218. Such resistance will ensure that operation of the motor 248 will rotate the sun gear of the planetary gear train 246 to rotate the cylinder 218 about the fourth rotational axis A4 from the load position (FIG. 16) to the unload position (FIG. 17) without rotating the driveshaft 252 about the fifth rotational axis A5. While the cylinder 218 rotates about the fourth rotational axis A4, the driveshaft 252 will also rotate about the fourth rotational axis A4. The planetary gear train 246 will continue to rotate the cylinder 218 about the fourth rotational axis A4 until the cylinder 218 contacts a stop member (e.g., a protrusion on the second arm portion 216 that limits the range of rotation of the cylinder 218 relative to the second arm portion 216).

Thereafter, continued operation of the motor 248 in the same direction will cause the planetary gear train 246 to rotate the driveshaft 252 about the fifth rotational axis A5 (without any further rotation of the cylinder 218 about the fourth rotational axis) to move the piston 244 from the retracted position to the extended position. Such movement of the piston 244 toward the extended position pushes the patty in the cylinder 218 out of the open axial end 242 of the cylinder 218 and onto the cooking surface 204.

Figure 20:
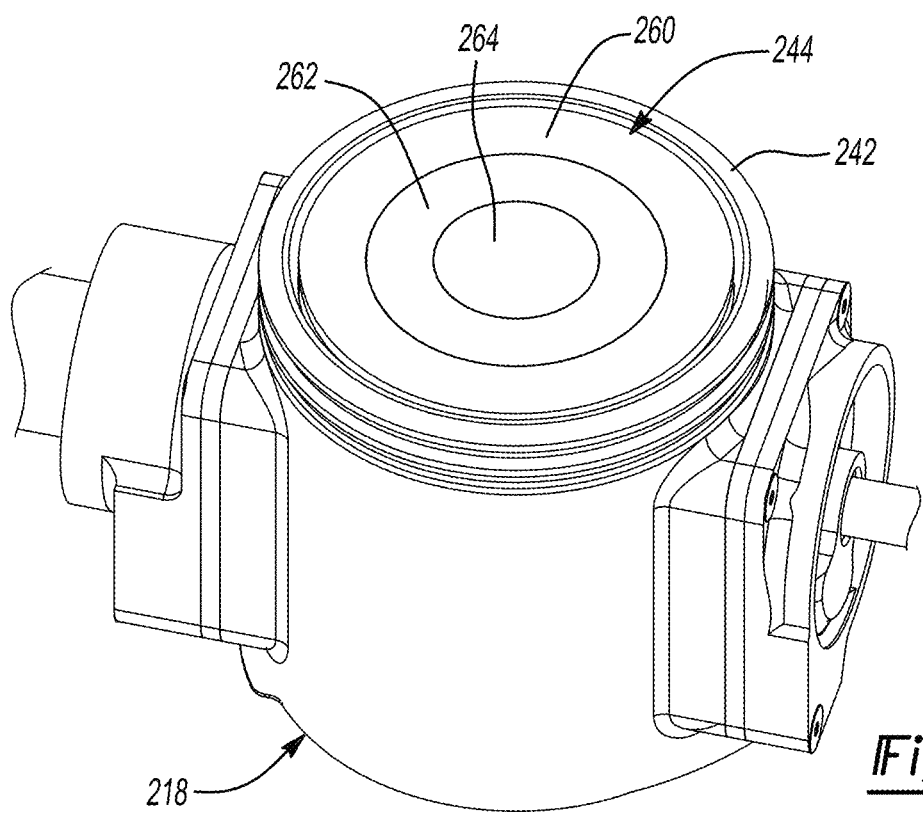
FIG. 20 is a perspective view of the cylinder and piston stages in a flat position.
Figure 21:
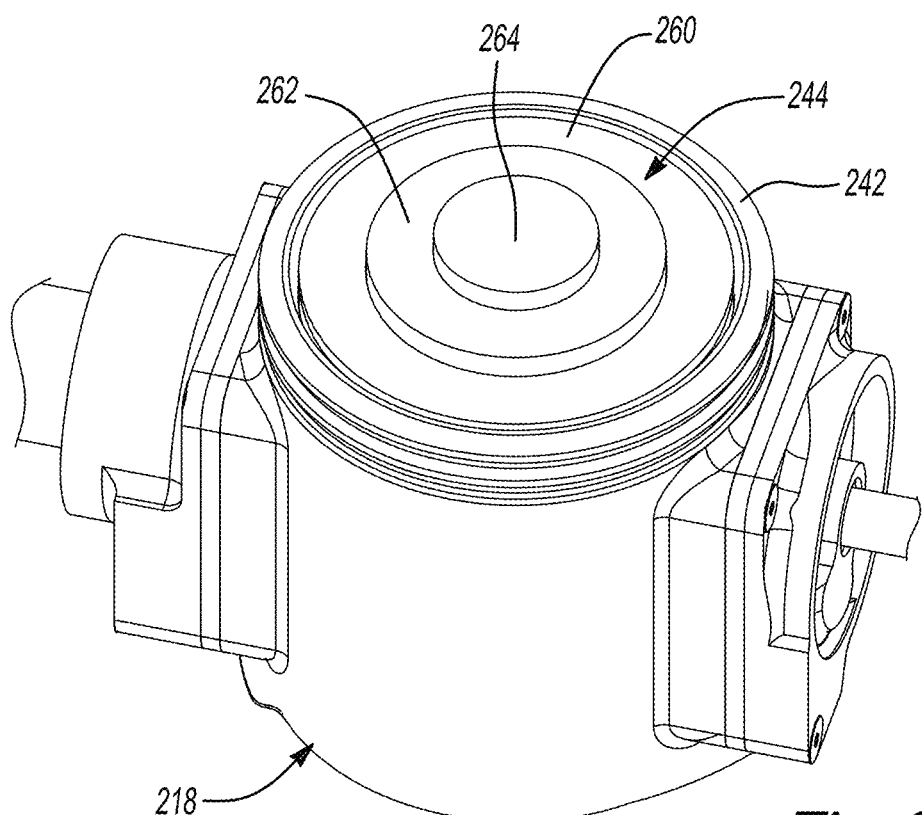
FIG. 21 is a perspective view of the cylinder and piston stages in a deployed position.

As shown in FIGS. 20 and 21, the piston 244 may include a plurality of stages. For example, the piston 244 may include an outer stage 260, an intermediate stage 262, and an inner stage 264. As shown in FIG. 18, the stages 260, 262, 264 may be concentric bodies. The outer stage 260 surrounds the intermediate and inner stages 262, 264 such that the intermediate and inner stages 262, 264 are received within the outer stage 260. The intermediate stage 262 surrounds the inner stage 264 such that the inner stage 264 is received within the intermediate stage 262. The intermediate stage 262 is movable in an axial direction (i.e., along a longitudinal axis of the cylinder 218 extending through opposite axial ends of the cylinder 218) relative to the outer stage 260, and the inner stage 264 is movable in the axial direction relative to the outer stage 260 and the intermediate stage 262. In other words, the intermediate and inner stages 262, 264 are independently movable in the axial direction relative to the outer stage 260.

The intermediate and inner stages 262, 264 are movable relative to the outer stage 260 between a flat position (FIG. 20) and a deployed position (FIG. 21). In the flat position, axially facing surfaces of the outer, intermediate and inner stages 260, 262, 264 are substantially coplanar with each other. In the deployed position, the axially facing surface of the intermediate stage 262 is axially spaced apart from the axially facing surface of the outer stage 260, and the axially facing surface of the inner stage 264 is axially spaced apart from the axially facing surface of the intermediate stage 262.

As shown in FIG. 18, a pin 266 extends through the connecting rod 256, through apertures 268 in the outer stage 260, through apertures 270 in the intermediate stage 262, and through apertures 272 in the inner stage 264. The pin 266 transmits motion of the connecting rod 256 to the stages 260, 262, 264 to move the piston 244 between the retracted position and the extended position.

As shown in FIG. 18, the apertures 272 of the inner stage 264 are sized relative to the pin 266 to provide clearance for the inner stage 264 to move axially relative to the pin; and the apertures 270 of the intermediate stage 262 are sized relative to the pin 266 to provide clearance for the intermediate stage 262 to move axially relative to the pin (but not as much axial movement as the inner stage 264). The apertures 268 of the outer stage 260 may be sized to provide little or no clearance for axial movement of the outer stage 260 relative to the pin 266 (i.e., the outer stage 260 can move axially relative to the pin 266 less than the intermediate stage 262. In the example shown in the figures, the apertures 272 of the inner stage 264 are more elongated in the axial direction than the apertures 270 of the intermediate stage 262, and the apertures 270 of the intermediate stage 262 are more elongated than the apertures 268 of the outer stage 260. The apertures 268 may not be elongated at all.

Figure 16:
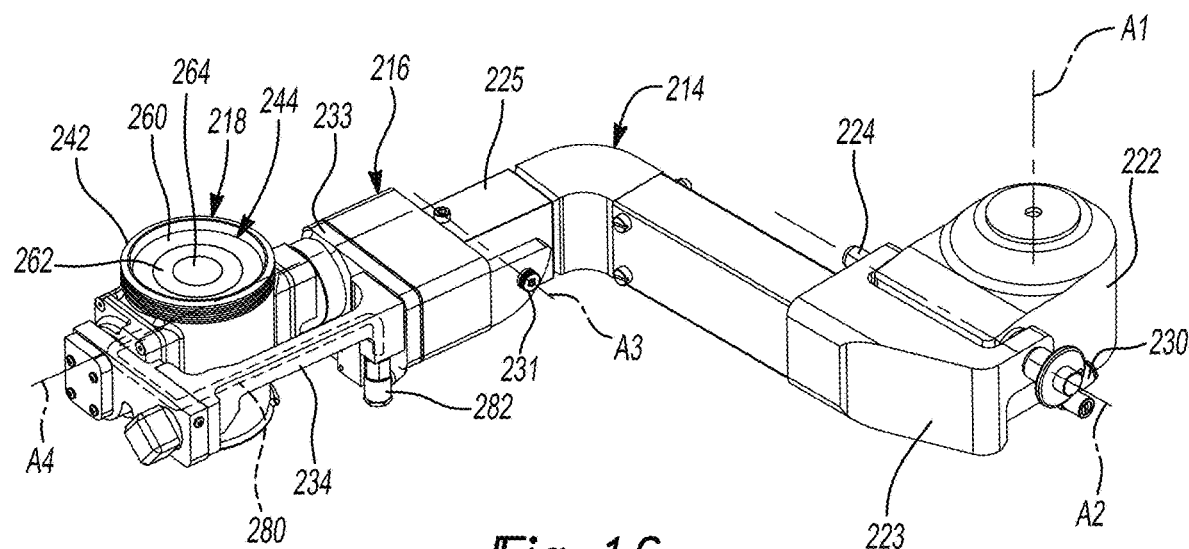
FIG. 16 is a perspective view of the arm assembly with a cylinder in a load position.
Figure 17:
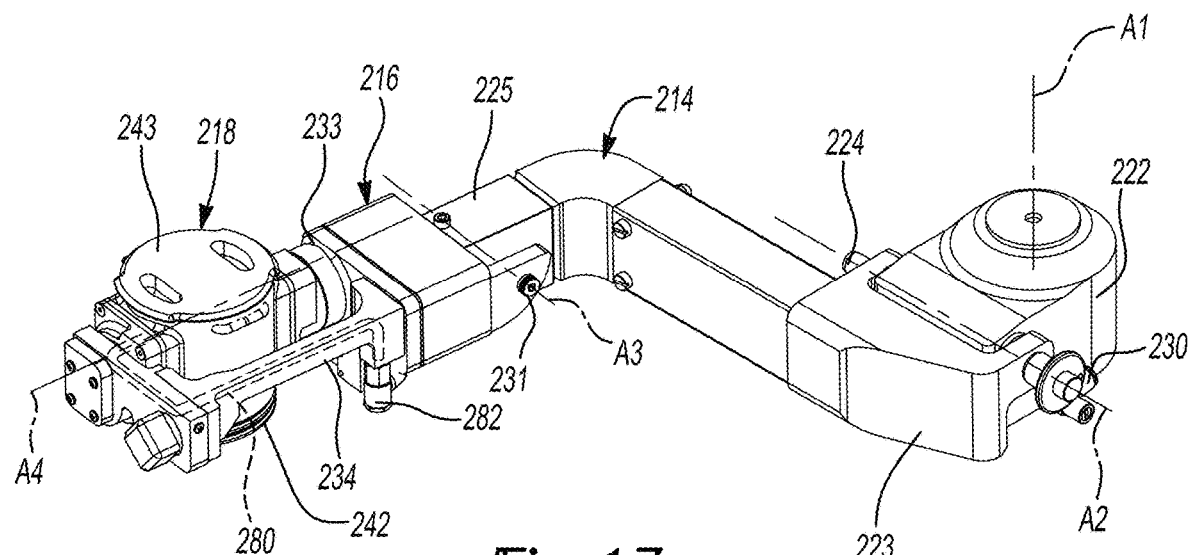
FIG. 17 is a perspective view of the arm assembly with the cylinder in an unload position.
Figure 18:
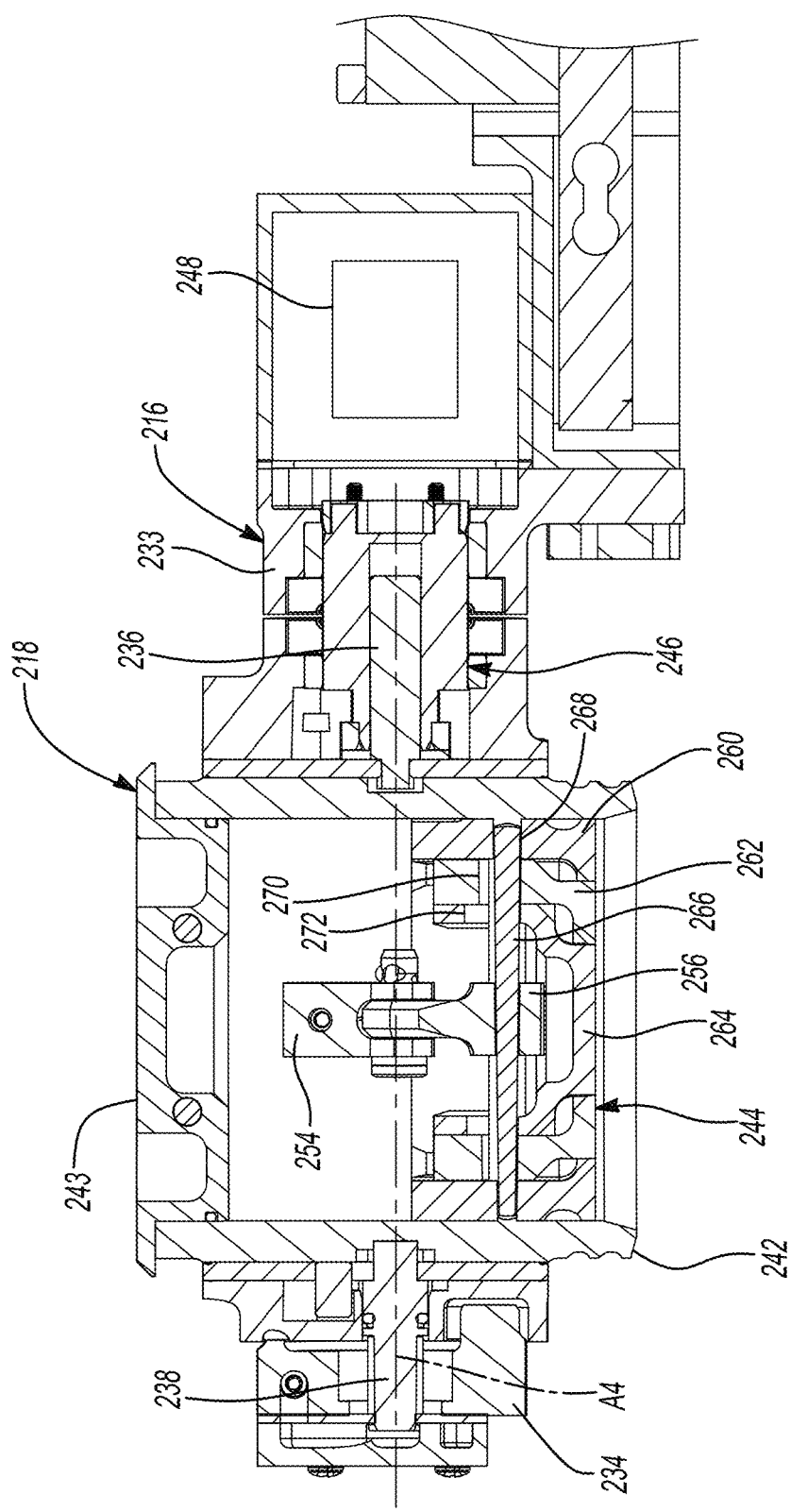
FIG. 18 is a partial cross-sectional view of the arm assembly.

As shown in FIGS. 15-17, the second member 234 of the second arm portion 216 may include a gas passage 280 that extends between a gas port 282 and an interior of the cylinder 218 between the piston 244 and a closed axial end 243 of the cylinder 218. A source of compressed gas (e.g., compressed air, nitrogen, carbon dioxide, etc.) (not shown) may be connected to the gas port 282. One or more valves and/or pumps (not shown) may control a flow of gas between the source of compressed gas and the gas port 282. In some configurations, the gas passage 280 may be in communication with the interior of the cylinder 218 via a passage extending longitudinally through the second shaft 238.

Once the cylinder 218 has been rotated to the unload position, compressed gas may be leaked from the cylindrical bores 228 in the sleeve body 222 to allow the plungers 226 to retract into the bores 228 to move the first and second arm portions 214, 216 and the cylinder 218 from the raised position (FIG. 14) to the lowered position (FIG. 15). Thereafter (or concurrently therewith), compressed gas may be provide to the interior of the cylinder 218 to aid in dispensing the patty from the cylinder 218 onto the cooking surface 204 when the cylinder 218 is in the unload position (i.e., with the open axial end 242 facing downward toward the cooking surface 204). That is, the compressed gas may push the intermediate and inner stages 262, 264 axially downward to the deployed position (FIG. 21). Moving the intermediate and inner stages 262, 264 to the deployed position helps to prevent the patty from sticking to the piston 244. Moving the first and second arm portions 214, 216 and the cylinder 218 between the lowered position and the raised position may help to dislodge the patty from the piston 244. Moving the first and second arm portions 214, 216 and the cylinder 218 to the lowered position also reduces a distance that the patty has to fall from the cylinder 218 to the cooking surface 204. In some configurations, one or more of the stages 260, 262, 264 may be provided with ports through which compressed air can be injected to assist in dislodging the patty from the cylinder 218. In some configurations, ports can be provided in the cylinder 218 to blow air across one or more of the stages 260, 262, 264 to help separate the patty from the cylinder 218. It will be appreciated that any combination of the above methods and features can be employed to dislodge the patty from the cylinder 218.

After the patty has dropped out of the cylinder 218, compressed gas can be provided to the bores 228 to move the first and second arm portions 214, 216 and the cylinder 218 back to the raised position to provide clearance for the arm assembly 210 to pivot about the first rotational axis A1 toward the grinder 130. Compressed gas in the cylinder 218 may leak to the atmosphere or drawn back out of the cylinder 218 by a pump.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a food dispenser;
a cooking surface; and
an arm assembly configured to receive a food product from the food dispenser and transport the food product to the cooking surface,
wherein:
the arm assembly comprises:
  an arm portion;
  an actuator driving rotation of the arm portion about a first rotational axis;
  a cylinder attached to the arm portion and rotatable relative to the arm portion about a second rotational axis; and
  a piston axially movable within the cylinder between a retracted position and an extended position,
the piston includes a plurality of stages,
the stages are physical parts of the piston,
at least one of the stages is movable axially relative to another of the stages between a first position and a second position,
the stages include an inner stage and an outer stage that surrounds the inner stage,
the inner and outer stages are configured to support the food product,
the piston moves in a first axial direction from the retracted position to the extended position,
the inner stage is movable in the first axial direction relative to the outer stage to push the food product in the first axial direction away from the outer stage, and
the inner and outer stages are movable relative to the cylinder.

2. The system of claim 1, wherein:
the stages include an intermediate stage,
the outer stage surrounds and movably receives the intermediate stage, and
the intermediate stage surrounds and movably receives the inner stage.

3. The system of claim 2, wherein:
a pin extends crosswise to the first axial direction and extends through apertures in the outer, intermediate, and inner stages,
the apertures of the inner stage are sized relative to the pin to allow a first range of axial movement of the inner stage relative to the pin,
the apertures of the intermediate stage are sized relative to the pin to allow a second range of axial movement of the intermediate stage relative to the pin, and
the first range of axial movement is greater than the second range of axial movement.

4. The system of claim 1, wherein axially facing surfaces of the stages are coplanar in the first position and are axially spaced apart from each other in the second position.

5. The system of claim 1, wherein the arm portion is pivotable about a third rotational axis to move the cylinder between a raised position and a lowered position.

6. The system of claim 5, wherein:
the second rotational axis is perpendicular relative to the first rotational axis, and
the third rotational axis is perpendicular relative to the first rotational axis.

7. The system of claim 1, wherein:
the arm portion includes a first arm portion and a second arm portion, and
the second arm portion is pivotably connected to the first arm portion and supports the cylinder for rotation about the second rotational axis.

8. The system of claim 7, further comprising a load cell attached to the first and second arm portions.

9. The system of claim 1, wherein the food dispenser is a grinder.

10. A system comprising:
a food dispenser; and
an arm assembly configured to receive a food product from the food dispenser and transport the food product,
wherein:
the arm assembly comprises:
  an arm portion;
  a cylinder attached to the arm portion and movable relative to the food dispenser between a load position and an unload position; and
  a piston axially movable within the cylinder between a retracted position and an extended position,
the piston is configured to support the food product when the cylinder is in the load position,
the piston includes a plurality of stages,
the stages are physical parts of the piston,
at least one of the stages is movable axially relative to another of the stages between a first position and a second position,
the stages include an inner stage and an outer stage that surrounds the inner stage,
the inner and outer stages are configured to support the food product,
the piston moves in a first axial direction from the retracted position to the extended position,
the inner stage is movable in the first axial direction relative to the outer stage to push the food product in the first axial direction away from the outer stage, and
the inner and outer stages are movable relative to the cylinder.

11. The system of claim 10, wherein:
the stages include an intermediate stage,
the outer stage surrounds and movably receives the intermediate stage, and
the intermediate stage surrounds and movably receives the inner stage.

12. The system of claim 11, wherein:
a pin extends crosswise to the first axial direction and extends through apertures in the outer, intermediate, and inner stages,
the apertures of the inner stage are sized relative to the pin to allow a first range of axial movement of the inner stage relative to the pin,
the apertures of the intermediate stage are sized relative to the pin to allow a second range of axial movement of the intermediate stage relative to the pin, and
the first range of axial movement is greater than the second range of axial movement.

13. The system of claim 11, wherein axially facing surfaces of the stages are coplanar in the first position and are axially spaced apart from each other in the second position.

14. The system of claim 10, further comprising a load cell attached to the arm portion and configured to detect a weight of the food product in the cylinder.

15. The system of claim 10, wherein the arm assembly includes a gas passage in communication with an interior of the cylinder between the piston and a closed axial end of the cylinder.

16. The system of claim 15, further comprising:
   a source of compressed gas in communication with the gas passage and configured to provide compressed gas to the interior of the cylinder,
   wherein the compressed gas in the interior of the cylinder causes movement of at least one of the stages of the piston relative to another of the stages.

17. The system of claim 10, further comprising:
   a cooking surface,
   wherein the arm portion is configured to position the cylinder over the cooking surface while the cylinder is in the unload position.

18. The system of claim 10, wherein the arm portion is rotatable about a first rotational axis and about a second rotational axis that is perpendicular to the first rotational axis.

19. The system of claim 10, wherein the food dispenser comprises a grinder.

20. The system of claim 19, wherein the food product comprises ground meat.

\* \* \* \* \*